US007557861B2

(12) United States Patent
Wyman

(10) Patent No.: US 7,557,861 B2
(45) Date of Patent: Jul. 7, 2009

(54) REVERSE PULL-DOWN VIDEO USING CORRECTIVE TECHNIQUES

(75) Inventor: Richard Hayden Wyman, Sunnyvale, CA (US)

(73) Assignee: Broadcom Corporation, Irvine, CA (US)

( * ) Notice: Subject to any disclaimer, the term of this patent is extended or adjusted under 35 U.S.C. 154(b) by 508 days.

(21) Appl. No.: 10/945,587

(22) Filed: Sep. 21, 2004

(65) Prior Publication Data

US 2005/0168653 A1 Aug. 4, 2005

Related U.S. Application Data

(60) Provisional application No. 60/540,816, filed on Jan. 30, 2004.

(51) Int. Cl.
*H04N 7/01* (2006.01)
(52) U.S. Cl. ...................................... 348/441
(58) Field of Classification Search ................. 348/441, 348/448, 452, 458, 459, 699, 700, 451, 453; 375/240.1
See application file for complete search history.

(56) References Cited

U.S. PATENT DOCUMENTS

| 4,400,719 | A | | 8/1983 | Powers |
| 5,337,154 | A | * | 8/1994 | Dorricott et al. ............ 348/448 |
| 5,428,399 | A | | 6/1995 | Robinson et al. |
| 5,457,499 | A | | 10/1995 | Lim |
| 5,861,924 | A | | 1/1999 | Pan et al. |
| 5,982,444 | A | * | 11/1999 | Kato et al. .................. 348/446 |
| 6,055,018 | A | * | 4/2000 | Swan ......................... 348/448 |
| 6,167,088 | A | * | 12/2000 | Sethuraman ............. 375/240.1 |
| 6,262,773 | B1 | | 7/2001 | Westerman |
| 6,269,484 | B1 | | 7/2001 | Simsic et al. |
| 6,317,165 | B1 | | 11/2001 | Balram et al. |
| 6,407,775 | B1 | | 6/2002 | Frink et al. |
| 6,459,455 | B1 | | 10/2002 | Jiang et al. |
| 6,509,933 | B1 | * | 1/2003 | Honda ........................ 348/558 |
| 6,563,550 | B1 | | 5/2003 | Kahn et al. |
| 6,603,815 | B2 | * | 8/2003 | Suzuki et al. ............. 375/240.2 |
| 6,614,484 | B1 | | 9/2003 | Lim et al. |
| 6,680,752 | B1 | | 1/2004 | Callway et al. |
| 6,970,206 | B1 | | 11/2005 | Swan et al. |
| 7,020,197 | B2 | * | 3/2006 | Tanase et al. ........... 375/240.12 |
| 7,042,512 | B2 | * | 5/2006 | Yang et al. .................. 348/452 |
| 7,075,581 | B1 | | 7/2006 | Ozgen et al. |
| 7,129,990 | B2 | | 10/2006 | Wredenhagen et al. |
| 7,170,561 | B2 | | 1/2007 | Winger et al. |

(Continued)

*Primary Examiner*—Paulos M Natnael
(74) *Attorney, Agent, or Firm*—McAndrews, Held & Malloy, Ltd.

(57) ABSTRACT

Aspects of the present invention may be found in a system and method to more effectively detect and correct irregularities of video in a pull-down video signal, such as a 3:2 (or 2:2) pull-down video signal. Various aspects of the present invention provide a system and method to determine when the cadence of pull-down video has changed. This may occur, for example, when a bad-edit is encountered in the pull-down video. Other aspects of the present invention may be found in a system and method of detecting and correcting distortion or artifacts occurring at the pixel level. The distortion or artifacts are detected and corrected at a per-pixel level while performing a reverse pull-down of the video signal. Finally, aspects of the invention allow the automatic enabling of per-pixel correction when performing a reverse 3:2 directed weave. A computed variable is used to automatically activate the per-pixel correction.

32 Claims, 15 Drawing Sheets

U.S. PATENT DOCUMENTS

| | | |
|---|---|---|
| 7,177,470 B2 * | 2/2007 | Jasinschi et al. ............ 382/170 |
| 7,202,907 B2 | 4/2007 | Chow |
| 7,375,760 B2 * | 5/2008 | Kempf et al. ............... 348/441 |
| 2002/0171759 A1 | 11/2002 | Handjojo et al. |
| 2003/0156301 A1 * | 8/2003 | Kempf et al. ............... 358/486 |
| 2004/0012673 A1 * | 1/2004 | Tanase et al. ................. 348/97 |
| 2005/0018087 A1 | 1/2005 | Lee |
| 2005/0030422 A1 * | 2/2005 | Leone et al. ................ 348/441 |
| 2005/0057646 A1 | 3/2005 | Cho et al. |

* cited by examiner

3:2 Phase Lock Detector (PLD)

REVERSE PULL-DOWN VIDEO USING CORRECTIVE TECHNIQUES

CROSS-REFERENCE TO RELATED APPLICATIONS/INCORPORATION BY REFERENCE

This application makes reference to, claims priority to, and claims benefit from U.S. Provisional Patent Application Ser. No. 60/540,816 entitled "IMPROVEMENT OF VIDEO USING CORRECTIVE TECHNIQUES" filed on Jan. 30, 2004, the complete subject matter of which is incorporated herein by reference in its entirety.

This application makes reference to:
U.S. patent application Ser. No. 10/314,525 filed Dec. 9, 2002;
U.S. application Ser. No. 10/945,769 filed Sep. 21, 2004;
U.S. application Ser. No. 10/875,422 filed Jun. 24, 2004;
U.S. application Ser. No. 10/945,619 filed Sep. 21, 2004;
U.S. application Ser. No. 10/871,758 filed Jun. 17, 2004;
U.S. application Ser. No. 10/945,796 filed Sep. 21, 2004;
U.S. application Ser. No. 10/945,817 filed Sep. 21, 2004;
U.S. application Ser. No. 10/945,729 filed Sep. 21, 2004;
U.S. application Ser. No. 10/945,828 filed Sep. 21, 2004;
U.S. application Ser. No. 10/946,152 filed Sep. 21, 2004;
U.S. application Ser. No. 10/871,649 filed Jun. 17, 2004,
U.S. application Ser. No. 10/946,153 filed Sep. 21, 2004; and
U.S. application Ser. No. 10/945,645 filed Sep. 21, 2004;

The above stated applications are hereby incorporated herein by reference in their entireties.

FEDERALLY SPONSORED RESEARCH OR DEVELOPMENT

Not Applicable

MICROFICHE/COPYRIGHT REFERENCE

Not Applicable

BACKGROUND OF THE INVENTION

When a circuitry performs a reverse pull-down of video, changes in the video cadence from that of a single clean cadence may result in visual distortions or artifacts when the video is displayed. This may occur when the video is composed of multiple cadences or is interlaced with a number of different video formats. These distortions or artifacts often occur, for example, when movies are post processed before they are broadcast. The post processing may comprise adding scrolling or fading titles. Other examples include the addition of movie trailers in which fades are performed between different scenes, or the inclusion of animated DVD menus in which different scenes may be previewed by way of a controller. These distortions or artifacts may result in video quality that is unacceptable to a viewer.

The limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Aspects of the present invention may be found in a plurality of systems and methods to more effectively detect and correct irregularities in a pull-down video signal.

In one embodiment, a method of detecting and correcting pixels that do not conform to expected luminance values when performing a reverse pull-down of video, comprises computing approximations of the luminance for one or more absent pixels in an execution field phase of a progressive output video frame, wherein the approximations are performed using one or more present pixels, computing one or more first differences between the approximations of the luminance for the one or more absent pixels and corresponding pixels in one or more adjacent fields of the execution field phase of the progressive output video frame, categorizing the one or more first differences into one or more expected high values and low values, and subtracting an average of the one or more expected high values from a maximum of the one or more expected low values, thereby generating one or more second differences.

In one embodiment, a method of detecting pixels that do not conform to expected pull-down video comprises computing one or more luma difference values between corresponding pixels of repeat fields originating from the same source film frame, wherein the computing is performed over one or more field phases, setting a corresponding variable equal to zero if each of the one or more luma difference values is less than a threshold value, and setting the corresponding variable equal to a product of a factor and the one or more difference values, if each of the one or more luma difference values is not less than the threshold value.

In one embodiment, a method of detecting changes in the cadence of pull-down video comprises computing an approximation of the luminance for each absent pixel in one or more detection field phases for a progressive output video frame using one or more present pixels, computing one or more first luminance differences between the approximation of luminance for each absent pixel and corresponding present pixels in one or more adjacent fields of the one or more detection field phases of the progressive output video frame, categorizing the one or more first luminance differences into one or more expected low values or one or more expected high values, and computing one or more second differences, wherein each of the one or more second differences is calculated by subtracting the maximum of the one or more expected low differences by an average of the one or more expected high differences.

In one embodiment, a method of automatically enabling a per-pixel correction process while performing a reverse 3:2 directed weave comprises using the reverse 3:2 directed weave if a variable is below a first threshold, using the reverse 3:2 directed weave with the per-pixel correction process if the variable is equal to or above a first threshold but below a second threshold, and using a motion adaptive deinterlace (MAD) process if the variable is equal to or above the second threshold.

In one embodiment, a system for detecting and correcting pixels that do not conform to expected luminance values when performing a reverse pull-down of video comprises a reverse 3:2 weave pull-down circuitry, a circuitry that detects and computes per-pixel unexpected field motion, a circuitry that detects and computes per-pixel repeat field motion, a circuitry that computes histograms and variances, a circuitry that computes a maximum of one or more values, and a circuitry that computes an operation using two values by using the maximum.

These and other advantages, aspects, and novel features of the present invention, as well as details of illustrated embodiments, thereof, will be more fully understood from the following description and drawings.

DETAILED DESCRIPTION OF THE INVENTION

Figure 1A:
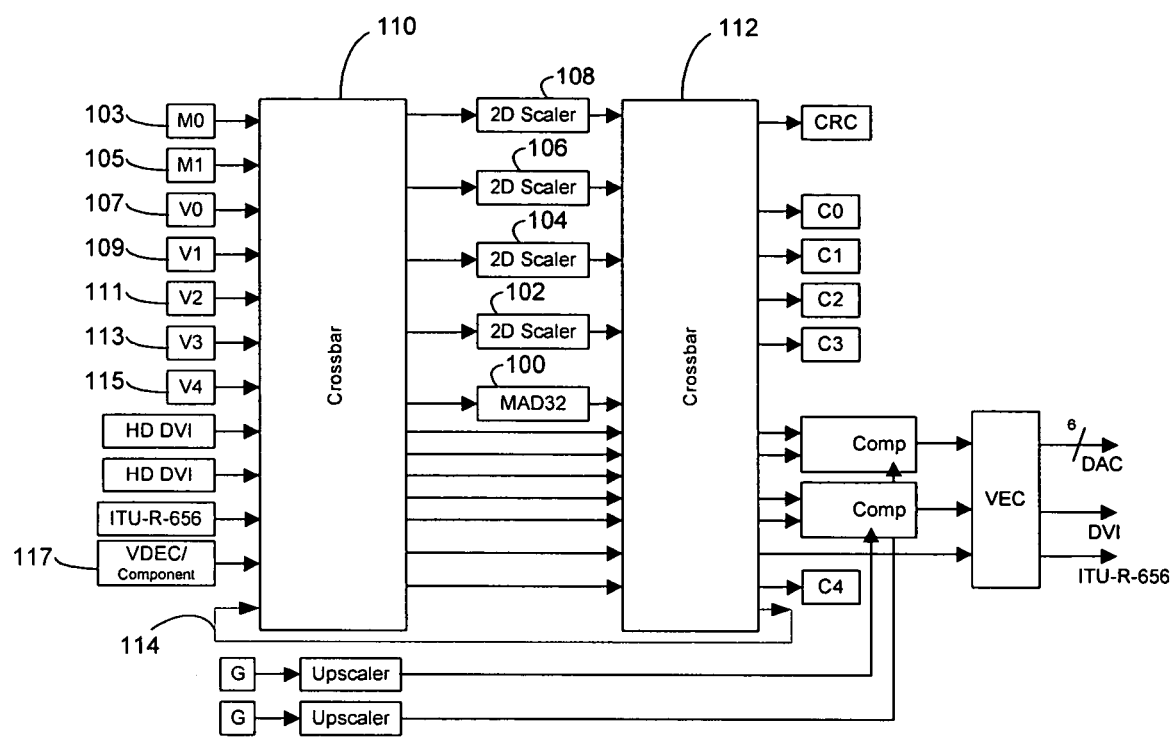
FIG. 1A is a block diagram of an exemplary architecture illustrating the positioning of a MAD-3:2, in accordance with an embodiment of the present invention.

Aspects of the present invention may be found in a system and method to more effectively detect and correct irregularities of video in a pull-down video signal. The pull-down signal may comprise a pull-down video signal such as a 3:2 (or 2:2) pull-down video signal. Various aspects of the present invention provide a system and method to determine when the cadence of pull-down video has changed. When it is determined that the cadence has changed, aspects of the invention engage in one or more processes such that the system effectively locks onto the correct phase. This may occur, for example, when a bad-edit is encountered in the pull-down video. Other aspects of the present invention may be found in a system and method of detecting and correcting distortion or artifacts occurring at the pixel level. The distortion or artifacts are detected and corrected at a per-pixel level while performing a reverse pull-down of the video signal. A reverse pull-down is used to generate deinterlaced progressive video frames. The various aspects of the present invention provide an improvement or enhancement of the pull-down video that is displayed to a viewer.

During detection of a bad-edit, the system and method ensures a visually pleasing transition to a new cadence in situations where editing was performed carelessly. In addition, aspects of the invention allow per-pixel correction of a pull-down video signal. The per-pixel correction may be employed to improve the quality of video when, for example, interlaced titles are laid over film based content.

Certain aspects of the invention may comprise a plurality of algorithms and architectures for a motion adaptive deinterlacer (MAD) capable of reverse 3:2 pull-down and 3:2 pull-down cadence detection, which may be referred to as MAD-3:2 or MAD32, that may be utilized in a video network (VN). The algorithms and architectures for the motion adaptive deinterlacer may be adapted to acquire interlaced video fields from one of a plurality of video sources in the video network and convert the acquired interlaced video fields into progressive frames, at double the display rate, in a visually pleasing manner.

The motion adaptive deinterlacer (MAD-3:2) may be adapted to accept interlaced video input from a video bus (VB) and output deinterlaced, progressive video to the video bus (BUS) utilized by the video network. The motion adaptive deinterlacer may accept up to, for example, 720×480i and produce, for example, 720×480p in the case of NTSC. For PAL, the motion adaptive deinterlacer (MAD) may accept, for example, 720×576i and produce, for example, 720×576p. Horizontal resolution may be allowed to change on a field-by-field basis up to, for example, a width of 720. The motion adaptive algorithm utilized by the motion adaptive deinterlacer (MAD-3:2) may be adapted to smoothly blend various approximations for the missing pixels to prevent visible contours produced by changing decisions. A plurality of fields of video may be utilized to determine motion. For example, in an embodiment of the invention, five fields of video may be utilized to determine motion. The motion adaptive deinterlacer (MAD) may produce stable non-jittery video with reduced risk of visual artifacts due to motion being misinterpreted while also providing improved still frame performance. The motion adaptive deinterlacer (MAD-3:2) may also provide additional fields per field type of quantized motion information, which may be selectable in order to reduce the risk of misinterpretation. For example, up to three (3) additional fields or more, per field type, of quantized low-cost motion information may optionally be selected in order to reduce risk of misinterpreted motion even further. This may provide a total historical motion window of up to, for example, 10 fields in a cost effective manner. Integrated cross-chrominance removal functionality may be provided, which may aid in mitigating or eliminating NTSC comb artifacts. A directional compass filtering may also be provided in order to reduce or eliminate "jaggies" in moving diagonal edges. The MAD-3:2 may provide reverse 3:2 pull-down to provide improved quality from film-based sources.

In accordance with another aspect of the invention, the algorithms and architectures for the motion adaptive deinter-lacer (MAD) may also be adapted to provide bad-edit detection and correction. Furthermore, per-pixel correction may also be provided to improve the quality of subject matter containing both film and video at the same time. For example, per-pixel correction may be utilized for interlaced titles, which have been overlaid on film-based content.

FIG. 1a is a block diagram of an exemplary architecture illustrating the positioning of a MAD-3:2 100, in accordance with an embodiment of the present invention. Referring to FIG. 1a, the MAD-3:2 100 along with a plurality of scalers (102, 104, 106, and 108), for example, may be positioned between a first crossbar 110 and a second crossbar 112. The first crossbar 110 may be referred to as an input crossbar and the second crossbar 112 may be referred to as an output crossbar.

The MAD-3:2 100 may comprise at least one video network input and at least one video network output and may be configured to maintain its own additional field stores. A feedback path may be provided from the output of the second crossbar 112 to the input of the first crossbar 110. This may allow any of the standard definition (SD) video sources such as the MPEG feeders 103 and 105, video feeders 107, 109, 111, 113 and 115, and/or VDEC 117, and so on, to function as an input to the MAD32 100 and/or one of the scalers 102, 104, 106, and 108. The MPEG feeders 103 and 105 may accept 4:2:0 and 4:2:2 video data and supply 4:2:2 video data. The video feeders 107, 109, 111, 113 and 115, may accept 4:2:2 video data and supply 4:2:2 video data. VDEC is a video decoder that accepts analog video as one or more types of video inputs. The one or more types of video inputs comprise composite video, S-Video, and/or component video. The output of the second crossbar 112 may be passed back to the first crossbar 110 via the feedback path 114.

U.S. patent application Ser. No. 10/314,525 filed Dec. 9, 2002 entitled "Network Environment for Video Processing Modules" discloses an exemplary crossbar network module and associated system, which is representative of the video network crossbar that may be utilized in connection with the present invention. Accordingly, U.S. patent application Ser. No. 10/314,525 filed Dec. 9, 2002 is hereby incorporated herein by reference in its entirety.

Figure 1B:
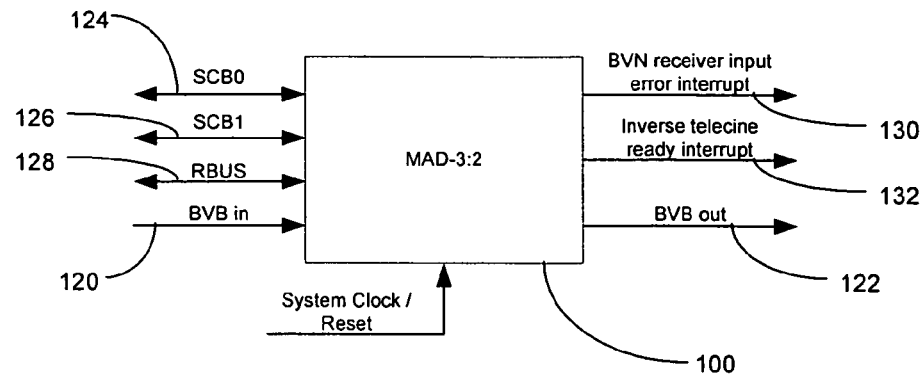
FIG. 1B is a block diagram illustrating exemplary interfaces for the MAD-3:2 shown in FIG. 1A, in accordance with an embodiment of the present invention.

FIG. 1b is a block diagram illustrating exemplary interfaces for the MAD-3:2 100 shown in FIG. 1a, in accordance with an embodiment of the present invention. Referring to FIG. 1b, the MAD-3:2 100 may comprise a plurality of bus interfaces and may include the capability to generate one or more system CPU interrupts. The MAD-3:2 100 may run on, for example, a single system clock. However, the invention may not be so limited and more than one clock may be utilized. In one embodiment of the invention, the MAD-3:2 100 may include a video bus (VB) input 120, a video bus output 122, and, for example, two independent bidirectional read/write SCB client connections, SCB0 124 and SCB1 126.

The video bus (VB) input 120 may be utilized for supplying fields to the MAD-3:2 100. The video bus output 122 may allow the deinterlaced output frames to be transferred throughout the video network and passed through a scaler before reaching a composite or capture block. An RBUS interface 128 may be utilized to configure the MAD-3:2 100 or to access its status via one or more interface signals and/or registers. At least a portion of the interfaces of the MAD-3:2 100 may be synchronous to a clock input of the scaler. A video network receiver input error interrupt 130 may be generated on an input field size, which may differ from a programmed field size, which is expected. An inverse telecine ready interrupt 132 may be generated for every field, or at least some fields, at the point in time when the statistics gathered in the previous field are ready to be read by a CPU or other processor.

Figure 1C:
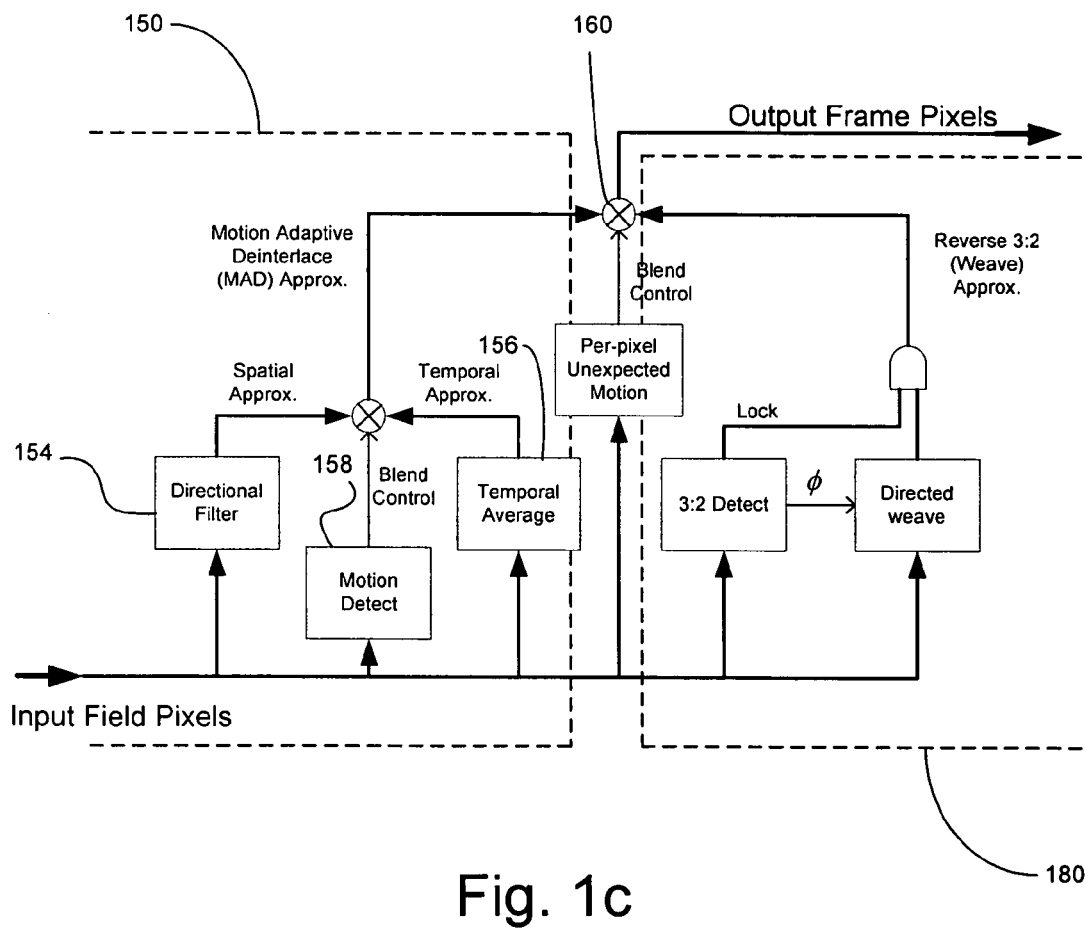
FIG. 1C is a block diagram illustrating an exemplary flow of the algorithm which may be utilized by the MAD-3:2 of FIG. 1A and FIG. 1B, in accordance with an embodiment of the present invention.

FIG. 1c is a block diagram illustrating an exemplary flow of the algorithm which may be utilized by the MAD-3:2 100 of FIG. 1a and FIG. 1b, in accordance with an embodiment of the present invention. Referring to FIG. 1c, there is shown a data flow corresponding to the algorithm utilized for deinterlacing the luma component of video. The algorithm may effectively be divided into two sub-blocks. For example, diagrammed on the left of FIG. 1c is the motion adaptive deinterlacer (MAD) method of deinterlacing 150 and on the right, there is shown the reverse 3:2 pull-down method 180. For every output pixel, motion adaptive deinterlacing 150, reverse 3:2 pull-down 180, or a blend 160 of motion adaptive deinterlacing and reverse 3:2 deinterlacing may be utilized to determine a motion-adapted value of the output pixel under consideration.

U.S. patent application Ser. No. 10/946,152 filed Sep. 21, 2004 entitled "Correlation Function for Signal Detection, Match Filters, and 3:2 Pulldown Detection," and U.S. patent application Ser. No. 10/871,758 filed Jun. 17, 2004 entitled "Detection and Phase Lock of Pull-Down Video," disclose one or more exemplary reverse 3:2 pull-down systems 180 and methods of deinterlacing, which may be utilized in association with the present invention. Accordingly, U.S. patent application Ser. No. 10/946,152 filed Sep. 21, 2004 and U.S. patent application Ser. No. 10/871,758 filed Jun. 17, 2004 are hereby incorporated herein by reference in their entireties.

The motion adaptive deinterlacer (MAD) 150 may comprise a directional filter 154, a temporal average 156, and a blender 158. The MAD 150 may comprise suitable logic, code, and/or circuitry and may be adapted for performing the MAD method of deinterlacing. A processor may be adapted to perform the operation of the MAD 150. The MAD 150 may comprise local memory for storage of data and/or instructions. The directional filter 154 may comprise suitable logic, code, and/or circuitry and may be adapted for spatially approximating the value of the output pixel. The temporal average 156 may comprise suitable logic, code, and/or circuitry and may be adapted for temporal approximation of the value of the output pixel. The blender 158 may comprise suitable logic, code, and/or circuitry and may be adapted to combine the temporal and spatial approximations of the value of the output pixel.

In operation, the MAD 150 may receive input field pixels from an interlaced video field and convert them into output frame fields in a progressive frame, at double the display rate. The horizontal resolution of the input to the MAD 150 may change on a field-by-field basis. The MAD 150 may utilize a motion adaptive algorithm that may smoothly blend various approximations for the output pixels to prevent visible contours, which may be produced by changing decisions. In an embodiment of the present invention, it may be necessary to determine the amount of motion around each output pixel, to use an appropriate approximation for the output pixel. The MAD 150 may utilize the directional filter 154, the temporal average 156, and the blender 158 to obtain a motion-adapted value for the output pixel that is visually pleasing.

Figure 2:
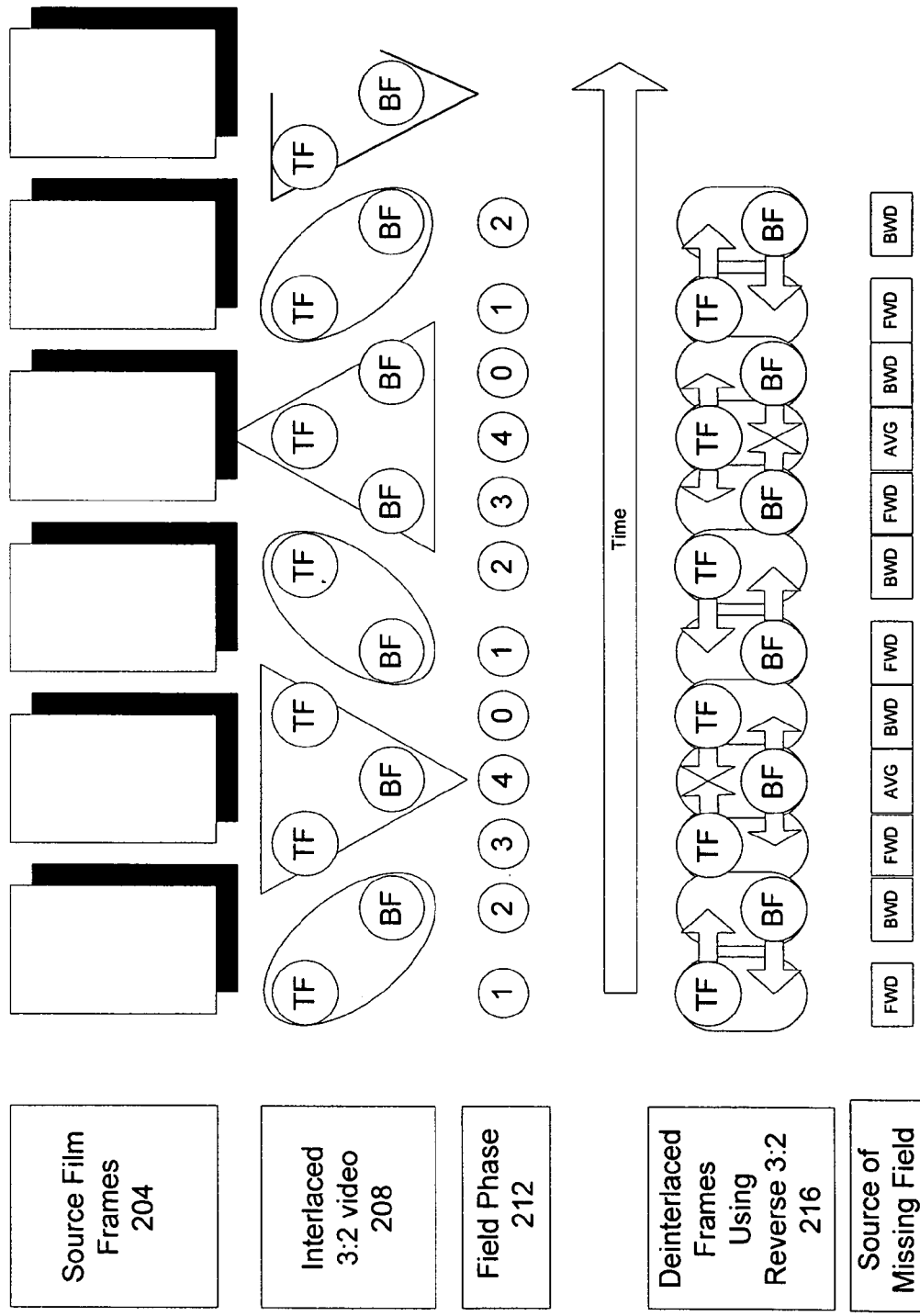
FIG. 2 is a block diagram illustrating the operation of performing reverse 3:2 pull-down when an interlaced 3:2 pull-down video is received in accordance with an embodiment of the invention.

FIG. 2 is a block diagram illustrating the operation of performing reverse 3:2 pull-down when an interlaced 3:2 pull-down video is received in accordance with an embodiment of the invention. One or more source film frames 204 are shown in the top portion of FIG. 2. Two source film frames 204 captured at a rate of 24 frames per second are used to generate 5 fields of video run at approximately 60 fields per second. Thus, the interlaced 3:2 video 208 comprises a sequence of top and bottom fields (labeled TF and BF) running at 60 fields per second. As shown, the first source film frame is represented by two fields while the second source film frame is represented by three fields. Since the interlaced video has a periodicity of 5 fields, the field phase 212 may be represented by a modulo 5 counter, as shown. Subsequently, the interlaced video may be deinterlaced using reverse 3:2 pull-down 216 as illustrated in the fourth row of FIG. 1. The directional arrows indicate the source of the missing field when deinterlaced progressive video is generated. The last row of FIG. 2 illustrates the direction of the weave 220 (either forwards or backwards in time) required in order to correctly utilize the appropriate source film frame when generating deinterlaced progressive video. In reverse 3:2 pull-down operation, the location of the pull-down field within the video stream is determined. As a consequence of determining the temporal location of the pull-down field, the current field phase may be easily extrapolated by way of the known 3:2 video cadence, as illustrated in FIG. 2. In this embodiment, the pull-down field is defined as field phase 0.

Figure 3:
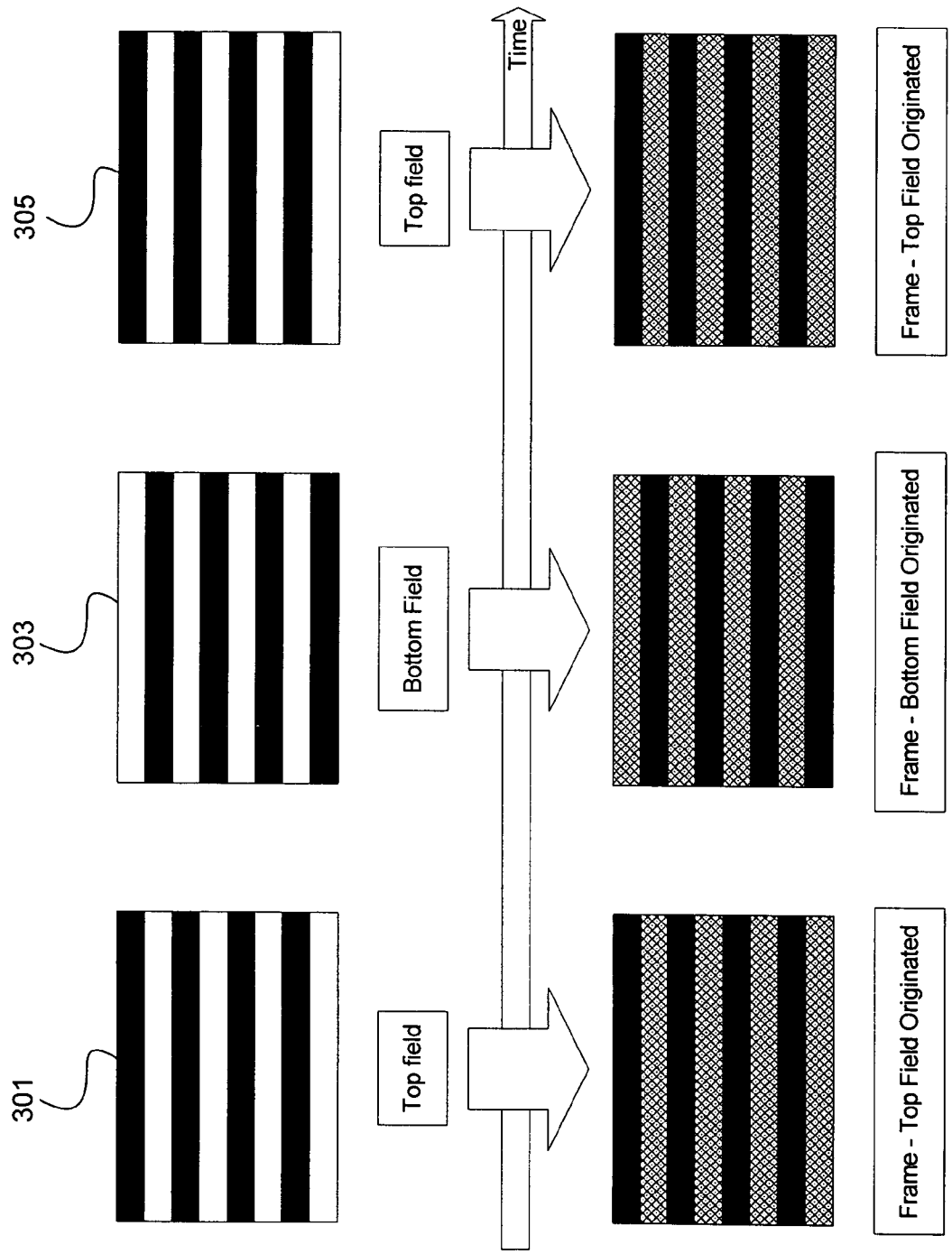
FIG. 3 illustrates an exemplary input and output of a deinterlacer, in accordance with an embodiment of the present invention.

FIG. 3 illustrates an exemplary input and output of a deinterlacer, in accordance with an embodiment of the present invention. Referring to FIG. 3, three fields are presented to the deinterlacer. The first field 301 is a top field, the second field 303 is a bottom field, and the third field 305 is a top field again. The first field 301 may be a bottom or top field, and the sequence of fields may alternate between top and bottom as appropriate depending on the first field 301. The deinterlacer may take the lines present in the field (black-colored lines in FIG. 3) and fill in the absent lines (clear lines in FIG. 3) to produce an output frame. The process of de-interlacing may be seen as taking in a line of pixels from the source field and producing two output lines of pixels at twice the previous frame rate. One line is the line that came from the source field and may be called the "present" line (black). The other line is the line that needs to be created and may be called the "absent" line (cross-hatched lines). The pixels of the absent line may be computed using a de-interlacing procedure incorporating 3:2 or 2:2 reverse pull-down or motion adaptive deinterlace approximation in accordance with an embodiment of the present invention. The frames output by the deinterlacer may comprise progressive video that is output at twice the previous frame rate.

Figure 4:
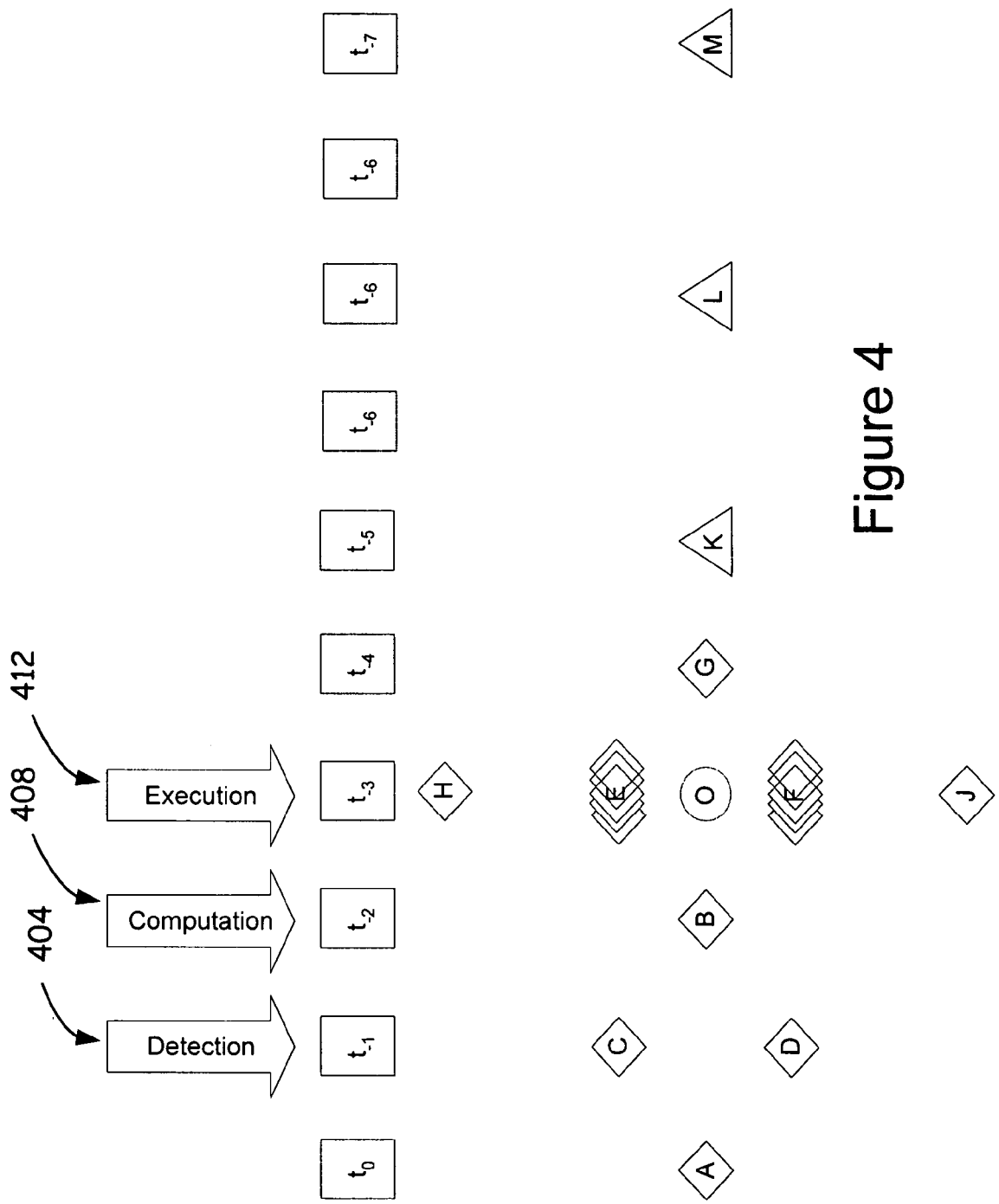
FIG. 4 illustrates an exemplary pixel constellation that is used in performing reverse 3:2 pull-down in accordance with an embodiment of the invention.

FIG. 4 illustrates an exemplary pixel constellation that is used in performing reverse 3:2 pull-down in accordance with an embodiment of the invention. The embodiment of FIG. 4 also illustrates a temporal sequence of one or more functional operations, that are effectively implemented by way of pipelined processing, in accordance with an embodiment of the invention. The pixel constellation provides an exemplary set of pixels, used by the reverse 3:2 pull-down process, for computing or approximating a pixel in a desired location. In reference to FIG. 4, the abscissa is represented by way of discrete indicators t0, t-1, t-2, t-3, etc. In reference to the lower portion of FIG. 4, the lettered elements correspond to a pixel constellation. The pixel constellation varies temporally along the abscissa and spatially along the ordinate. Further, the pixel constellation is defined in terms of a third coordinate axis that provides a second spatial dimension—this is illustrated by pixels E and F in FIG. 4. In one embodiment, the two spatial axes may comprise vertical and horizontal axes in a two dimensional spatial plane. In this embodiment, E0 and F0 correspond to the same horizontal position as the other pixels shown in FIG. 4 (e.g., A, B, C, D, H, G, and J).

Aspects of the invention provide three functional operations that are used in order to perform the reverse 3:2 pull-down. The first functional operation (e.g., the detect phase) gathers statistics related to the fields of the interlaced video. Then, in the second functional operation (e.g., the computation phase), those gathered statistics are used to generate a phase lock on the received 3:2 pattern, in which the current phase field is identified. Finally, at the third functional operation (e.g., the execution phase), the identified current phase field is used to reverse the 3:2 pull-down into deinterlaced frames. Referring to FIG. 4, the three functional operations are termed detection, computation, and execution. In the first functional timeframe (t-1) 404, the aforementioned statistics are collected. In the second functional timeframe (t-2) 408, a CPU (central processing unit) or a reverse 3:2 pull-down circuitry performs the required calculations to determine the current field phase. Before the end of the second functional timeframe, the configuration is readied so that at the third functional timeframe (t-3) 412, a correct selection for each absent pixel may be made, by way of the reverse 3:2 weave process. At one or more points in time, an assessment using the three functional operations may be made. In one embodiment, a 3:2 phase lock detector (PLD) receives interlaced 3:2 pull-down video (e.g. NTSC or PAL format) and processes the video field by field. In order to implement reverse 3:2 pull-down, the PLD must assess whether the input was originally sourced from film. Once this is determined, the current field phase, as described in reference to FIG. 2, must be determined so that the reverse 3:2 weave may be correctly performed. The PLD determines whether the received video is, in fact, interlaced 3:2 video by analyzing the correlation characteristics of one or more pixel pairs. In one embodiment, the PLD computes variances over time with respect to a number of repeat fields of the interlaced 3:2 video. As previously illustrated in FIG. 2, a repeated field is contained within a triplet (represented by triangular areas of the interlaced 3:2 video row of FIG. 2), or three fields corresponding to a particular source film frame. The one or more repeated fields will either originate from a top field or from a bottom field of the interlaced 3:2 video. Further, the repeated fields occur exactly t=2 time units between themselves (i.e., the two fields or output frames are exactly two time units apart). As a consequence, a histogram of the absolute differences between corresponding pixels originating from two fields that are separated by two time units may be calculated. Referring back to FIG. 4, the absolute differences between corresponding pixels for a first field sampled at t1=-1 (time=-1) and for a second field sampled at t-3=-3 (time=-3) may be calculated. Of course, the number of absolute differences calculated between a large number of pixel pairs provides a more accurate value of the variance. For example, an entire field of pixel pairs may be used in the calculation of absolute values. In one embodiment, the probability density function of the absolute differences of pixels between repeat fields may be characterized by a certain first probability density function, in accordance with an embodiment of the invention. On the other hand, the probability density function of the absolute differences of pixels between non-repeat fields may be characterized by a certain second probability density function, that differs from the first probability density function, in accordance with an embodiment of the invention.

Figure 5:
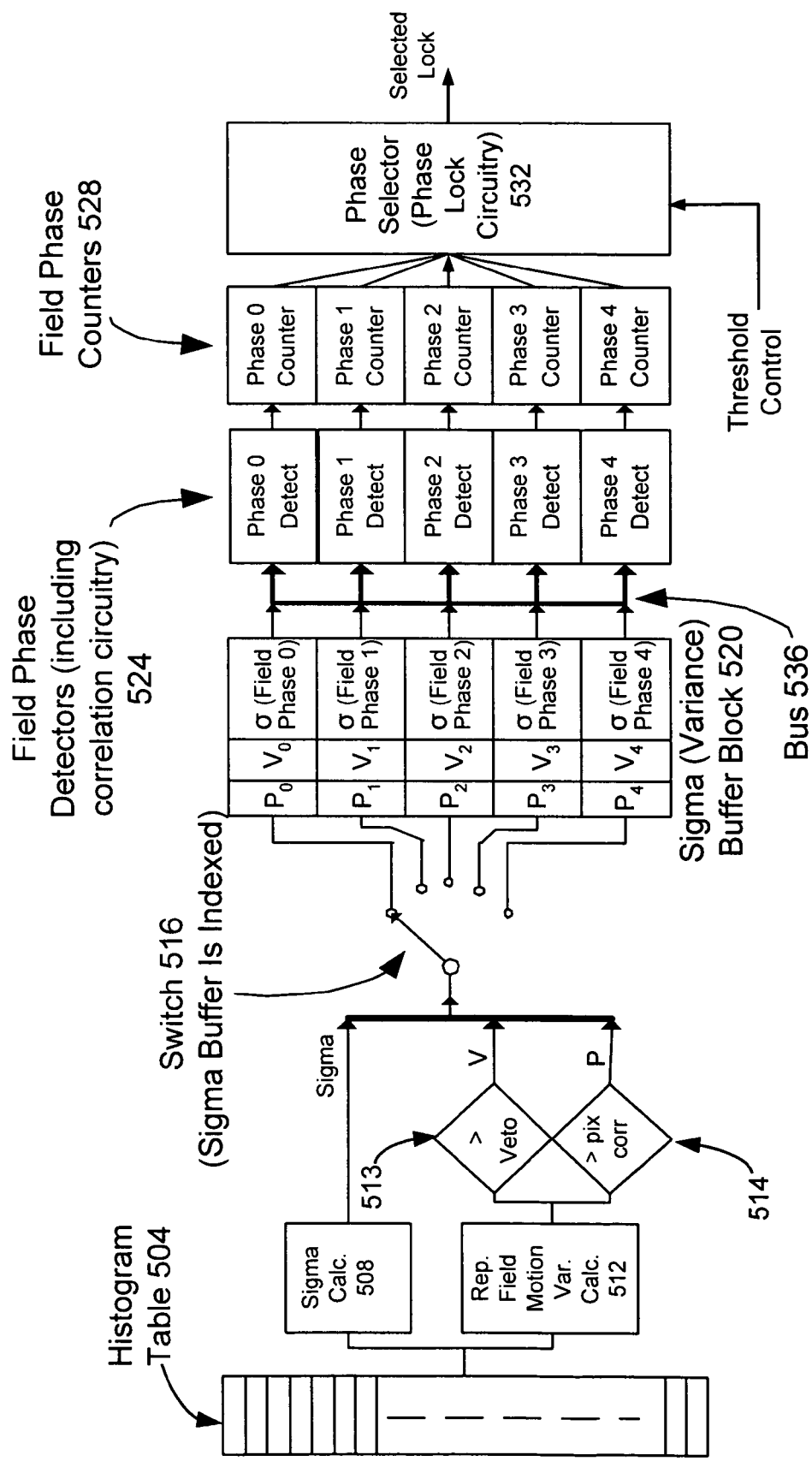
FIG. 5 is a block diagram of a system used to implement a 3:2 phase lock detector (PLD) in accordance with an embodiment of the invention.

FIG. 5 is a block diagram of a system used to implement a 3:2 phase lock detector (PLD) in accordance with an embodiment of the invention. The PLD comprises a histogram table 504, a sigma (or variance) calculator 508, a repeat field motion variance calculator 512, a veto circuitry 513, a pixel correction circuitry 514, a switch 516, a sigma (variance) buffer block 520, a set of five field phase detectors (field phase detector circuitry) 524, a set of five field phase counters 528, a phase selector 532, and a bus 536. In one embodiment, the histogram table is implemented using a memory such as a random access memory. The histogram table stores the one or more bins (e.g., the 64 bins previously described) used to calculate sigma. In one embodiment, the sigma 508 or repeat field motion variance calculator 512 may be implemented using logic circuitry. As previously mentioned, the sigma calculator 508 may incorporate and utilize the equation for sigma previously mentioned. The repeat field motion variance calculator 512, as defined later, computes a variance measure of a possible repeat field or 3:2 pull-down field. In one embodiment, the switch 516 may comprise an electronic switch capable of switching to one of five positions, as shown. The switch 516 facilitates transfer of the calculated values for sigma into the appropriate buffer location in the sigma buffer block 520. In one embodiment, the sigma buffer block 520 may be implemented using any type of memory or logic circuitry capable of storing five sigma values, as shown. The veto circuitry 513 and pixel correction circuitry 514 generate one or more indicators or flags that signify that the repeat field motion variance exceeds one or more (programmable) thresholds. These indicators, indicated by the variables P and V, are stored as shown in the sigma buffer block 520. For example, as each of the sigma values is written in to the sigma buffer block 520, a value of repf_motion (i.e., repeat field motion) is compared against a programmable veto threshold. If the repf_motion is greater than the veto threshold, then it indicates that its associated pull-down field cannot be a repeat field. When this occurs, a veto bit, represented by V, is appropriately set in the sigma buffer block 520. If this value is set, its corresponding field phase counter is set to zero and not allowed to increment. As a consequence, its phase is vetoed, and it cannot achieve phase lock. If the PLD was locked before this point in time, once this threshold is exceeded, its corresponding lock is removed. The phase veto is activated until the sigma value for this phase is updated (five fields later). If the newly measured value for repf_motion is lower than the veto threshold, the phase veto is removed and the counter for this phase is allowed to increment.

In one embodiment, the set of five phase detectors 524 comprises logic circuitry that incorporates the calculation or correlation of the sigma values using Pearson's correlation. A counter of the one or more of the five phase counters 528 are incremented when a particular field phase provides a correlation that is greater than a first (programmable) threshold. If the correlation provides a value that is less than the first threshold, the one or more phase counters 528 are decremented. If the value of one or more phase counters 528 increases beyond a second (programmable) threshold, it triggers a corresponding phase lock. Should a phase counter continue to increase, it reaches a saturation point above the second threshold. After a particular field phase counter initiates a phase lock, the PLD will lock onto the locked phase until it decreases beyond a third (programmable) threshold, at which the field phase becomes unlocked. The counter may decrease until it reaches a value of zero. The phase counters 528 may be examined to determine which, if any counters 528 are locked to a particular phase. In an embodiment in which more than one phase is locked onto, then the field phase that was first locked onto is selected as the actual locked field phase. In one embodiment, the phase selector 532 comprises logic circuitry that selects or locks onto a particular field phase as determined by the outputs of each of the five phase counters 528. The bus 536 is used to transmit, in parallel, a set of sigma buffer values (e.g., x0, x1, x2, x3, and x4) from the sigma buffer block 520 to the phase detectors 524. Each of the phase detectors 524 performs a Pearson's correlation using the current sigma vector (x0, x1, x2, x3, x4) during each field processing period. The functions and/or operations illustrated in the embodiment of FIG. 5 may be implemented using circuitry such as any type of logic circuitry. In an alternate embodiment, it is contemplated that the functions and/or operations illustrated in the system block diagram of the 3:2 phase lock detector (PLD), as illustrated in FIG. 5, may be implemented using software. The software may be executed by a central processing unit (CPU) that computes all necessary functions and/or operations required by the PLD.

In order to generate a field phase lock on one of the five possible field phase patterns, a history of the five previous sigma values is stored in the sigma buffer block 520. Initially all sigma values are set to zero. Once the first sigma value is calculated, it overwrites the value currently in the 0th buffer position of the sigma buffer block 520. In the next field period or field sample clock, the next value of sigma is calculated and is stored in the 1 st position. In the next field period, the 2nd position, is overwritten, and so forth and so on, through the 4th position. The process then reverts back to the 0th position, in which a newly calculated sigma value is overwritten over the last value. This means that a new sigma value is written into the appropriate field phase entry of the sigma buffer block 520 after every field period or field sample clock. After every fifth field, all five sigma buffer locations within the sigma buffer block 520 will have been replaced with new values.

Figure 6:
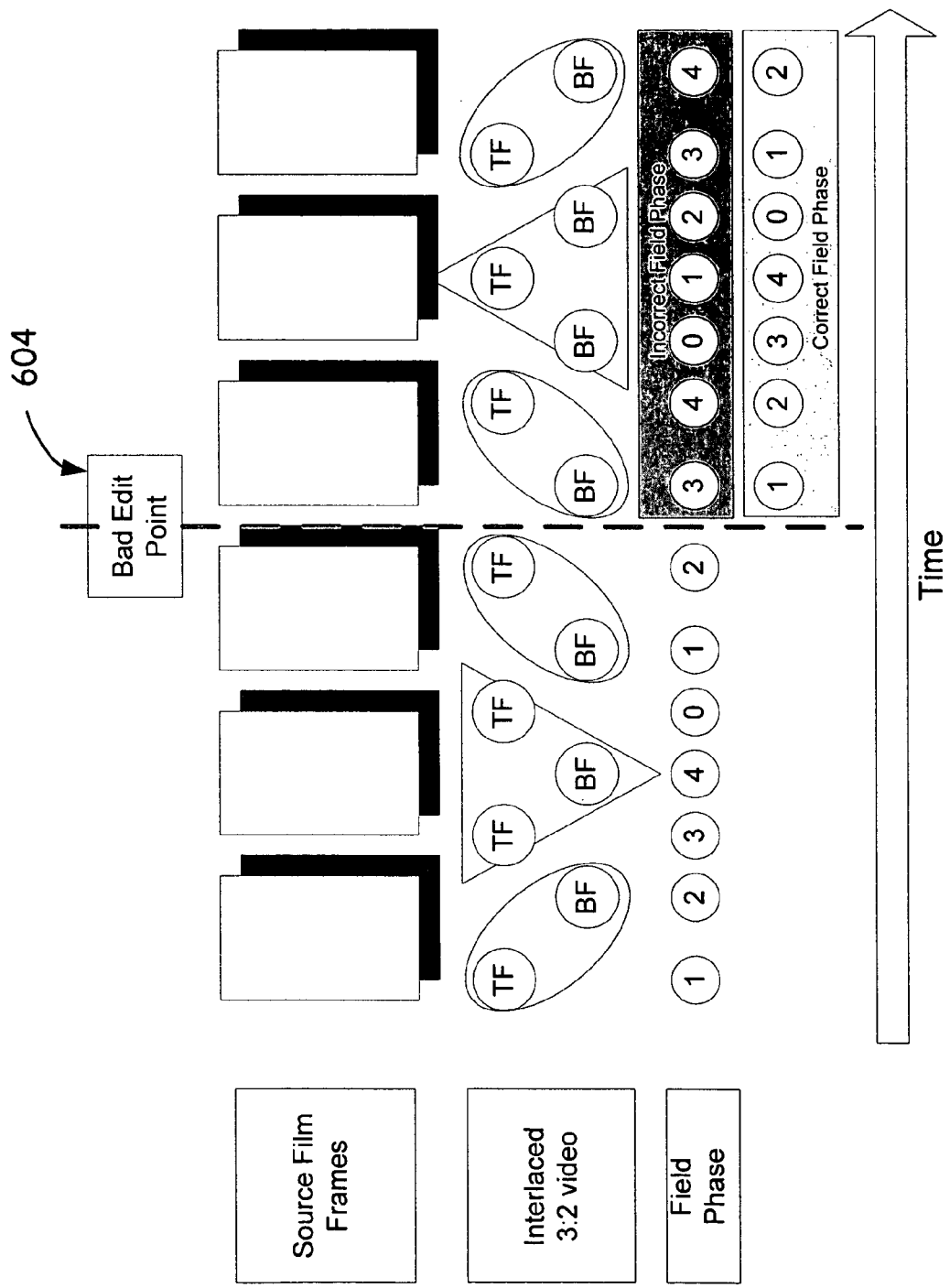
FIG. 6 is a relational block diagram illustrating how an incorrect field phase pattern is encountered when attempting to deinterlace 3:2 pull-down video in accordance with an embodiment of the invention.

FIG. 6 is a relational block diagram illustrating how an incorrect field phase pattern is encountered when attempting to deinterlace 3:2 pull-down video in accordance with an embodiment of the invention. As illustrated in FIG. 6, a "bad edit point" 604 is encountered in an interlaced 3:2 pull-down video as a result of a "bad-edit". In one embodiment, a "bad-edit" occurs when video is edited after a 3:2 pull-down has been performed. If editing is performed carefully, then the correct field pattern (or cadence) may be maintained. However, if a "bad edit" is made that corrupts the regular pattern or cadence of the video, then the predictability of the pattern, as shown, is affected. The pattern may effectively resume at a different phase of the interlaced 3:2 pull-down video. The bad edit may occur at any of one or more field phases. Referring to FIG. 6, a "bad-edit" results in changing the field phase from field phase 3 to field phase 1, for example.

Without any intervention, as provided by bad-edit detection previously described, the 3:2 phase lock detector (PLD), as referenced in FIG. 5, will determine that the phase that was previously locked onto is no longer valid, and may detect that a different phase is now valid. The phase counter representing the old phase will start decrementing while the phase counter for the newly locked phase will start incrementing. Eventually one or more relevant thresholds will be attained, such one or more newly locked field phases are selected by the phase selector, facilitating the resumption of correct reverse 3:2 pull-downs. Unfortunately, the process in which the new field phase is selected by the PLD may involve a significant period of time. As a consequence, during the transition period that occurs from one field phase to the next, the PLD may instruct control circuitry and/or pixel processing circuitry to weave the wrong fields together.

Figure 7:
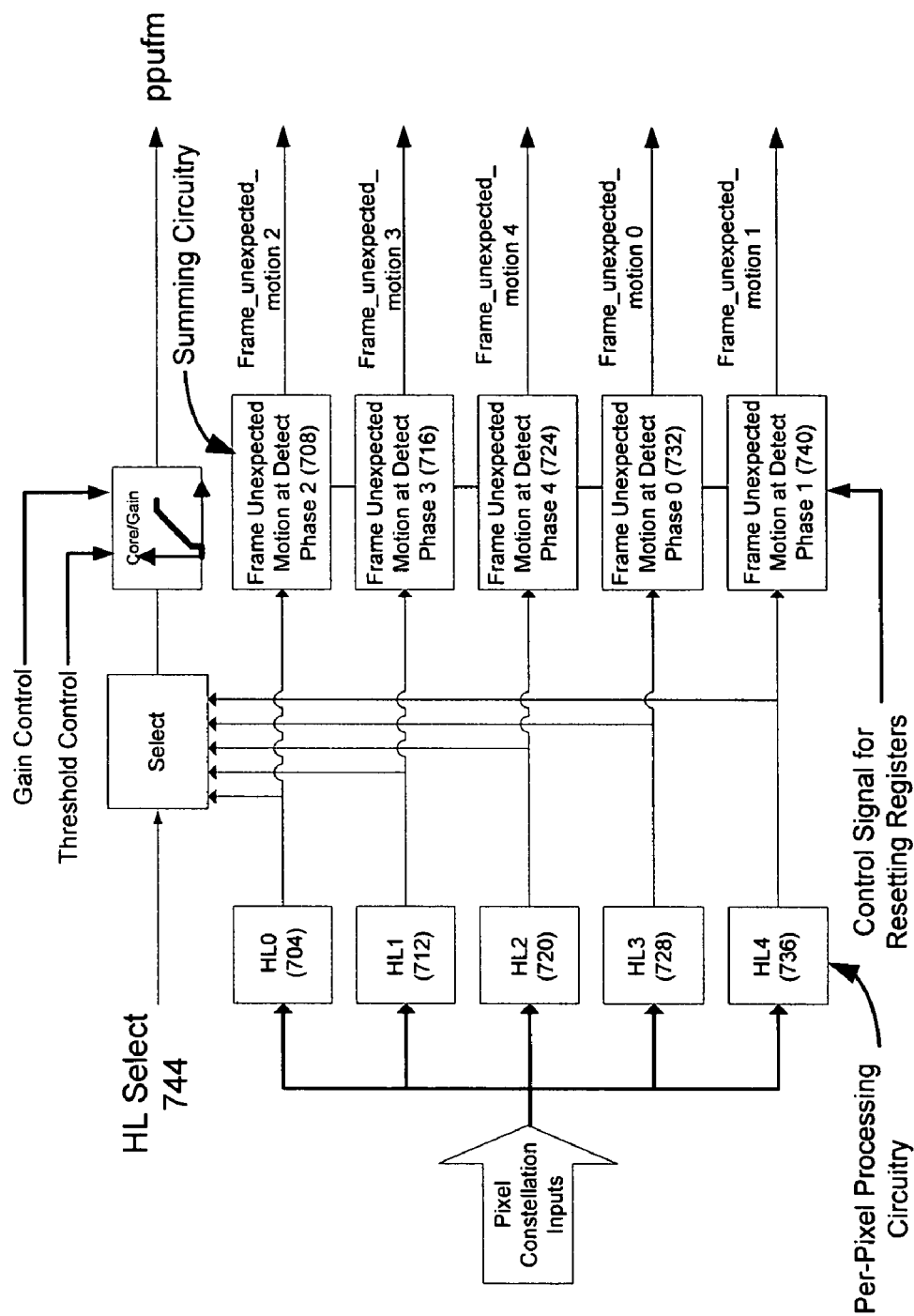
FIG. 7 is a block diagram illustrating a system referred to as an HL pattern block, used to determine changes in cadence that result, for example, from a "bad-edit", in accordance with an embodiment of the invention.

FIG. 7 is a block diagram illustrating a system referred to as an HL pattern block, used to determine changes in cadence that result, for example, from a "bad-edit", in accordance with an embodiment of the invention. The system illustrated in FIG. 7 provides "bad-edit" detection and correction by calculating a variable defined as a frame unexpected motion value The frame unexpected motion value may be obtained by summing the individual pixel frame unexpected motion values associated with each absent pixel (as described in FIG. 4) for each output progressive video frame. In a representative embodiment, these pixel frame unexpected motion values are generated by taking the difference between the maximum of one or more expected low values and the average of one or more expected high values. In another representative embodiment, the pixel frame unexpected motion values are generated by taking the difference between the maximum of one or more expected low values and the minimum of the one or more expected high values. Yet, in one or more other embodiments, one or more calculations that compares what is expected between corresponding pixels of fields and what is actually measured, may be used instead. Each of the one or more expected low values and high values are based on the difference between an approximation of the luma of the absent pixel and the luma of the corresponding pixels in an adjacent field. As illustrated in FIG. 7, luma values for the pixel constellations in one or more fields are used to generate the frame unexpected motion and per-pixel unexpected field motion (ppufm). These luma values, referred to as pixel constellation inputs are input into the HL pattern block, as shown in FIG. 7.

The HL pattern block comprises per-pixel processing sub-blocks 704, 712, 720, 728, 736 and summing sub-blocks 708, 716, 724, 732, 740. Each of the per-pixel processing sub-blocks 704, 712, 720, 728, 736 is associated with a corresponding field phase as referenced by the phase lock detector (PLD). These field phases are designated from 0 through 4. Each field phase, at the PLD, is associated with an expected High/Low pattern. The High/Low pattern corresponds to expected high and expected low values obtained when one computes the difference in luma between corresponding pixels in adjacent fields.

Figure 8:
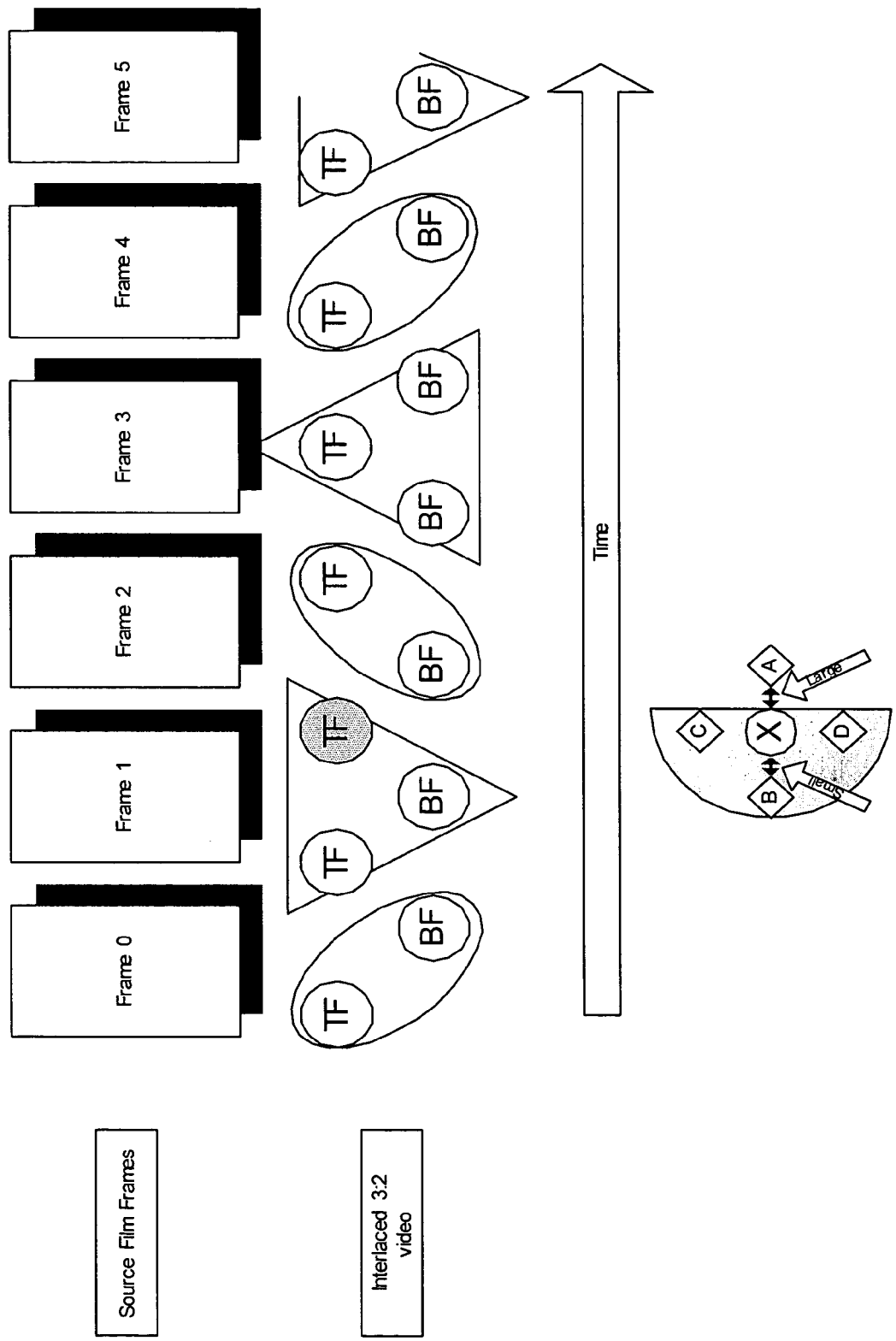
FIG. 8 is a block diagram that illustrates the relationship of a pixel in a repeat field to corresponding pixels in adjacent fields in accordance with an embodiment of the invention.

FIG. 8 is a block diagram that illustrates the relationship of a pixel in a repeat field to corresponding pixels in adjacent fields in accordance with an embodiment of the invention. FIG. 8 describes a "bad-edit" detection mechanism which may be used to elicit unexpected changes in the 3:2 pull-down pattern and prevents control circuitry and/or pixel processing circuitry of the MAD-3:2 from performing an incorrect weave. Consider the source film frames converted to 3:2 interlace format using 3:2 pull-down as shown in FIG. 8. The repeat field (3rd field of source film frame 1) that originated from film frame 1 will produce a top-field originated deinterlaced frame. Referring to a simple pixel constellation shown in the lower portion of FIG. 8, that lines up with this repeat field, it is seen that an approximation for X (e.g., an absent pixel) may be given as:

$$X = \frac{C+D}{2}$$

As illustrated in FIG. 8, it may be seen that pixel B, in an adjacent field, originates from the same original source film frame as pixels C and D, while pixel A crosses the boundary into a different source frame. If an assumption is made that motion is present in the filmed object and there is not a large amount of vertical detail provided by frames 1 and 2, B will be very similar to X since there is no motion occurs within fields sourced from the same source film frame. However, pixel A will be quite different from X since it is located in different frames. On occasion, the previous assumption may not be true due to artifacts. However, on average, it would be expected that the differences between B's and X's of two adjacent fields originating from the same source film frame will be small while the differences between A's and X's over adjacent fields originating from different source film frames will be large. As the constellation pattern previously described in reference to FIG. 4 lines up with different parts of the 3:2 pattern are shifted against the pixel constellation, the pixel crossing into a different source film frame may be pixel B rather than pixel A. Also, in the middle of the pull-down (e.g., the bottom field (BF) for source film frame 1), both A and B will be from the same source film frame as C and D; as a consequence, both field differences would be expected to be low. The key to the "bad-edit" detector is that once phase lock is achieved, the current field phase is known and the expected pattern of luma differences between pixels of adjacent fields, using the pixel constellation may be determined. If the measured differences are large when they were expected to be small then there is a good indication that there is an issue with the 3:2 pattern, perhaps due to a "bad edit" situation. With reference to FIG. 4, one may mathematically describe the vertical approximation of the absent or missing pixels may be defined as follows:

$$\alpha = \frac{C+D}{2}, \beta = \frac{E_0 + F_0}{2}$$

where E0 and F0 correspond to spatially identical pixels occurring two time units ago, having a horizontal spatial component that lies in the same plane as C and D.

Using the pixel constellation previously defined, the luma difference for the absent or missing pixel and corresponding pixel in an adjacent field may be defined mathematically as follows:

$$d_0 = abs(A - \alpha)$$

$$d_1 = abs(B - \alpha)$$

$$d_2 = abs(B - \beta)$$

$$d_3 = abs(G - \beta)$$

A "bad-edit" may occur when these luma difference values ($d_0$, $d_1$, $d_2$, and $d_3$) fall outside their expected low and high values. Using the HL pattern block as illustrated in FIG. 7, luma difference values (or field difference values) for a pixel constellation may be used to generate frame unexpected motion and per-pixel unexpected field motion (ppufm).

Referring back to FIG. 7, one of the five per pixel processing sub-blocks 704, 712, 720, 728, 736 is selected by way of the HL select signal 744 based on a feedback signal (e.g., selected lock or current field phase) provided by the PLD, for example. As a consequence, one of the five per-pixel processing sub-blocks 704, 712, 720, 728, 736 is used in the calculation or computation of the per-pixel unexpected field motion (ppufm) value. Another per-pixel processing sub-block 704, 712, 720, 728, 736 may be used when the selected lock is changed, as determined by the PLD. The ppufm value is defined by an equation that will be described later. The per-pixel processing sub-blocks 704, 712, 720, 728, 736 may comprise circuitry such as digital logic circuitry that implements the equation.

Also shown are a number of summing sub-blocks 708, 716, 724, 732, 740 used in calculating the frame unexpected field motion. The frame unexpected field motion performs a summation of one or more values that correspond to the output provided by the per-pixel processing sub-blocks 704, 712, 720, 728, 736. The results of the summations are used to determine whether changes in cadence have occurred, such as in the instance a "bad-edit" has occurred. Also shown is a control signal used to reset the one or more registers located within the summing circuitry of the summing sub-blocks 708, 716, 724, 732, 740.

Figure 9:
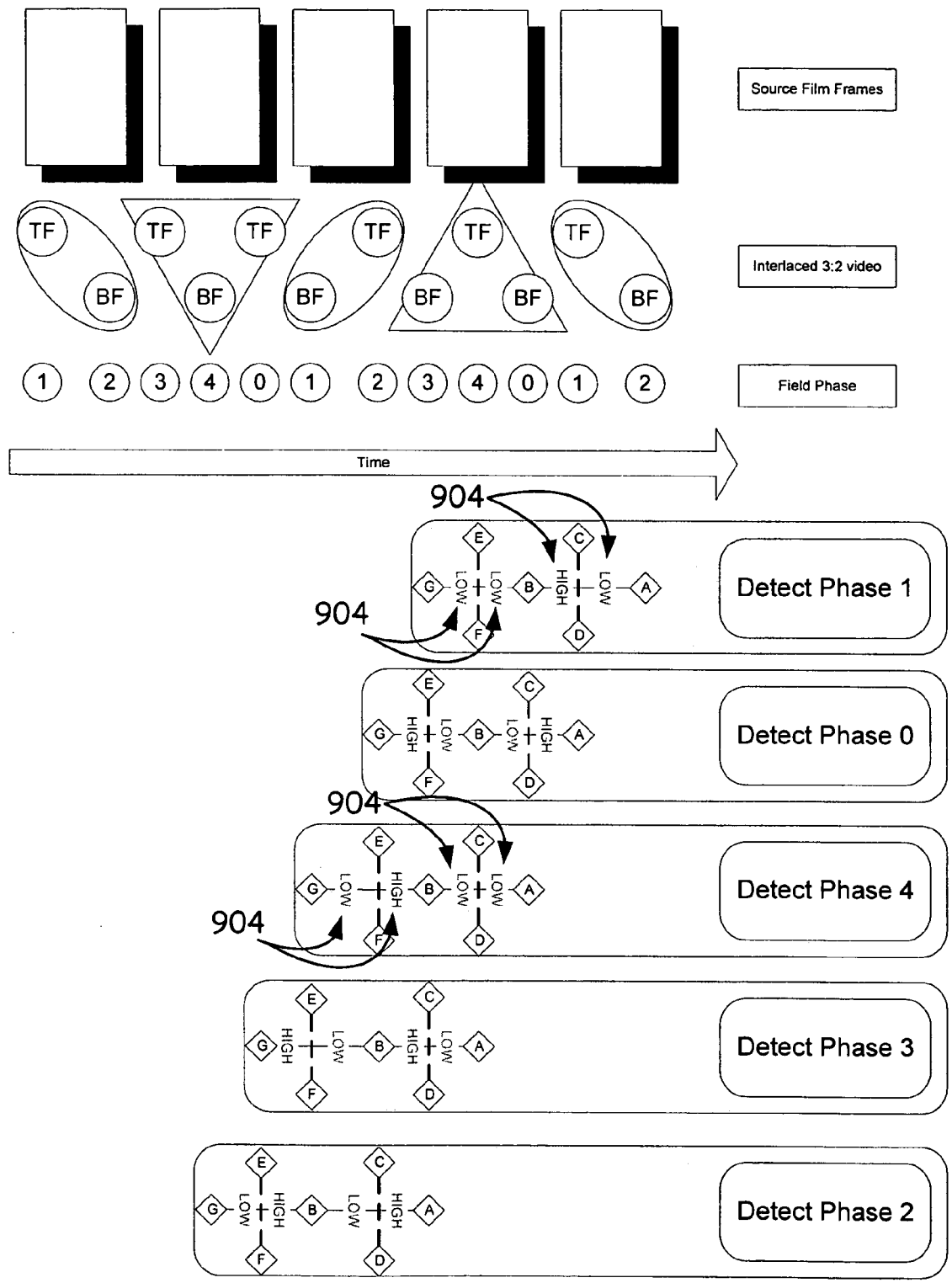
FIG. 9 is a block diagram illustrating a method of using one or more luma values of present pixels of an exemplary pixel constellation to determine conformity to one or more expected "High/Low" luma difference patterns between pixels of a progressive video output frame, as referenced to the detection phase of the MAD-3:2, in accordance with an embodiment of the invention.

FIG. 9 is a block diagram illustrating a method of using one or more luma values of present pixels of an exemplary pixel constellation to determine conformity to one or more expected "High/Low" luma difference patterns 904 between pixels of a progressive video output frame, as referenced to the detection phase of the MAD-3:2, in accordance with an embodiment of the invention. The pixel constellation comprises the pixels labeled A through G shown in FIG. 9. The expected "High/Low" differences of the "High/Low" difference patterns 904 are computed by taking the difference between one or more luma values of present pixels (i.e., one or more available pixels, as provided by the source film frames, and represented by the pixel constellation) of the exemplary pixel constellation and one or more luma values of a missing or absent pixel of the progressive video output frame. The "High" differences have luma values that are large in magnitude and are associated with corresponding pixels of different source film frames. The "Low" differences have luma values that are small in magnitude and are associated with corresponding pixels of the same source film frame. FIG. 9 illustrates an embodiment, in which the "High/Low" luma difference patterns 904 utilizes two absent or missing pixels or a pair of absent or missing pixels. It is contemplated that in other embodiments, more than two absent or missing pixels and their associated pixel constellation may be used to characterize one or more "High/Low" luma difference patterns or field difference patterns 904. As a prerequisite to computing the one or more "High" or "Low" differences, the two absent or missing pixels are approximated using one or more present pixels (i.e., available pixels), as provided by the pixel constellation shown. In the embodiment of FIG. 9, the absent or missing pixels are approximated using adjacent vertical pixels of the progressive video output frame. Referring to FIG. 9, there are shown five different "High/Low" luma difference patterns or field difference patterns 904 associated with the five different field phases as referenced at the execution processing stage of the aforementioned three stage processing pipeline. As previously described with respect to an exemplary embodiment, the first stage comprises a detection processing stage, the second stage comprises a computation processing stage, and the third stage comprises an execution processing stage.

In one embodiment, a measure of "unexpected motion" or unexpectedness of the "High/Low" luma difference patterns or field difference patterns 904 is provided by computing the maximum of the low luma difference values and subtracting this value with the average of the high luma difference values. As illustrated in Table 1, the "unexpected motion" termed the detector pixel unexpected motion, m, is represented by one or more equations using the one or more luma differences associated with the luma difference patterns 904. The "High/Low" luma difference patterns 904 are illustrated in FIG. 9 and are defined in FIG. 9 for each of the five field phases. In the following table 1, the expected "High/Low" difference pattern is provided for each detection field phase of the MAD-3:2. Furthermore, the "High/Low" pattern, shown in Table 1, conforms with the embodiment illustrated in FIG. 9.

TABLE 1

| Field Phase at Detector | Expected High/Low Pattern | Detector Pixel Unexpected Motion (m) |
|---|---|---|
| 0 | HIGH-LOW-LOW-HIGH | $MAX\langle d_1, d_2 \rangle - \left(\frac{d_0 + d_3}{2}\right)$ |
| 1 | LOW-HIGH-LOW-LOW | $MAX\langle d_0, d_2, d_3 \rangle - d_1$ |
| 2 | HIGH-LOW-HIGH-LOW | $MAX\langle d_1, d_3 \rangle - \left(\frac{d_0 + d_2}{2}\right)$ |
| 3 | LOW-HIGH-LOW-HIGH | $MAX\langle d_0, d_2 \rangle - \left(\frac{d_1 + d_3}{2}\right)$ |
| 4 | LOW-LOW-HIGH-LOW | $MAX\langle d_0, d_1, d_3 \rangle - d_2$ |

In the embodiment of FIG. 9, the measured "High" luma differences values should be greater in value than the measured "Low" luma difference values when 3:2 pull-down is received by the MAD-3:2. When 3:2 pull-down video is received, the detector pixel unexpected motion, m, may be a negative value.

The value of the Frame_unexpected_motion is provided by the following equation. It is determined by summing the detector pixel unexpected motion, m, for each pair of absent pixels for the entire progressive video output frame. As shown in this embodiment Frame_unexpected_motion, m, for a certain absent pixel pair, is associated with a corresponding value (e.g., 0, 1, 2, 4, 8).

$$\text{Frame\_unexpected\_motion+=} \begin{cases} 0 & \text{when} -255 \leq m < 4 \\ 1 & \text{when } 4 \leq m < 8 \\ 2 & \text{when } 8 \leq m < 16 \\ 4 & \text{when } 16 \leq m < 32 \\ 8 & \text{when } 32 \leq m < 255 \end{cases}$$

In reference to the above equation, the shorthand notion, Frame_unexpected_motion+=, indicates that the term Frame_unexpected_motion is determined by taking a cumulative sum of m over all pixels in a frame. The value for the Frame_unexpected_motion is zeroed or reset between output frames using the control signal for resetting registers as was previously illustrated in FIG. 7. If, for example, the field phase referenced at the detector is field phase 4, the detector pixel unexpected motion, m, may be calculated for all absent or missing pixels in the progressive video output frame using the equation MAX $\langle d_0, d_1, d_3 \rangle - d_2$. If the value, m, for a particular pixel, provided by the equation MAX $\langle d_0, d_1, d_3 \rangle - d_2$ is equal to the value $-100$, for example, then this component of the frame_unexpected_motion is equal to the value zero. The value for the frame_unexpected_motion is obtained by summing the associated value of m provided by each of the one or more absent pixels of the progressive video output frame. If the measured value over the entire output frame is greater than a threshold then it is assumed that either a "bad-edit" has occurred or there has been a change to the 3:2 interlaced pull-down video. The change may comprise one or more changes related to video cadence or format. In one representative embodiment, the change corresponds to a transition from 3:2 interlaced pull-down video to normal interlaced video. In one embodiment, the threshold is a programmable threshold. In one embodiment, the value of the programmable threshold is approximately 150,000. When the threshold is exceeded, all phase counters of the PLD as was referenced earlier in FIG. 5, are reset to zero, and the reverse 3:2 pull-down is halted. When the phase counters are no longer phase locked, the MAD-3:2 will perform normal de-interlacing without the reverse 3:2 pull-down, as required until a subsequent phase lock occurs. The phase lock detector (PLD) is then free to increment the phase counters once again so that the PLD may lock onto a new phase.

Figure 10:
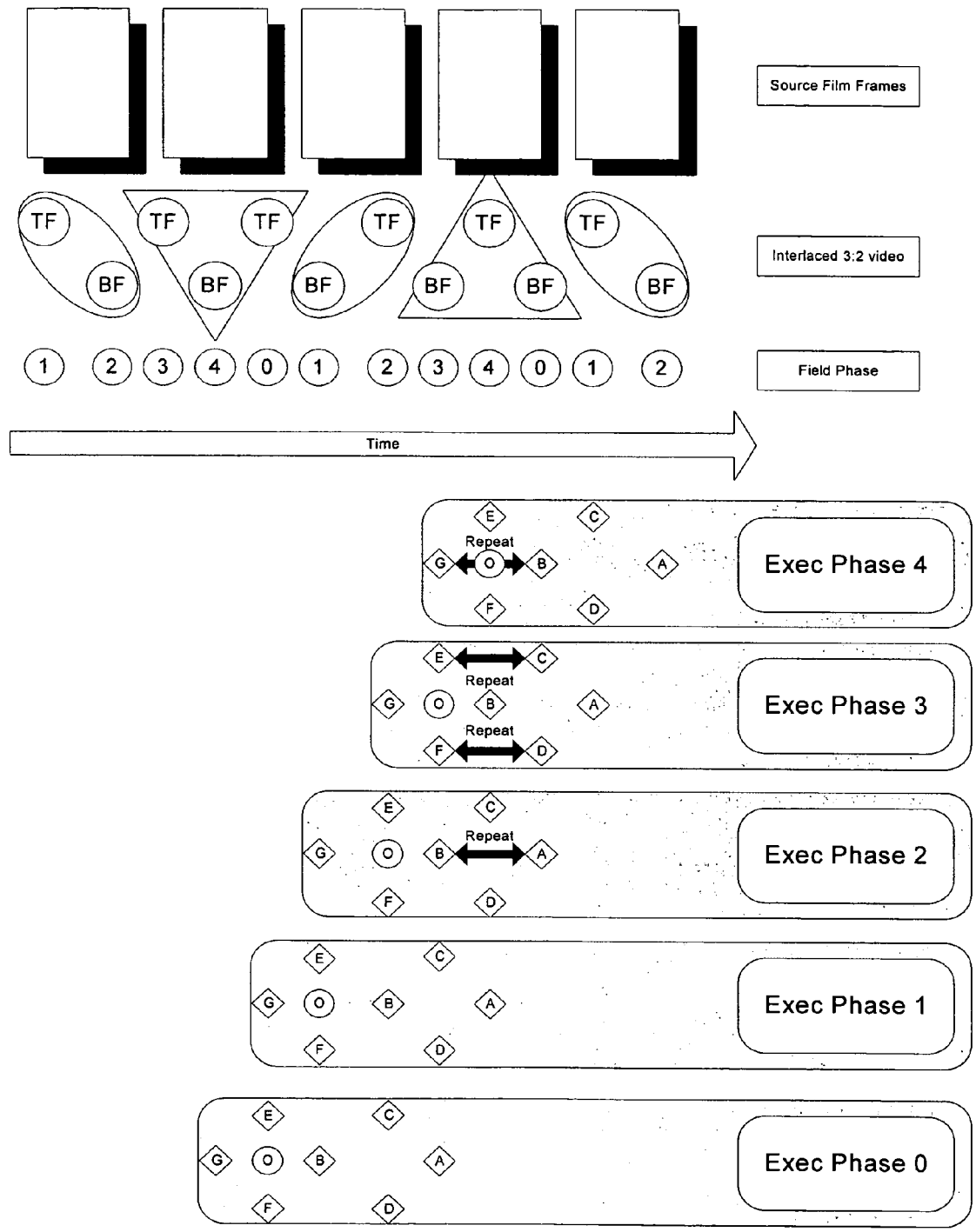
FIG. 10 is a block diagram illustrating a method of using the luma of present pixels of an exemplary pixel constellation to determine the per-pixel repeat field luma difference, as referenced with the execution phase of the MAD-3:2, in accordance with an embodiment of the invention.

FIG. 10 is a block diagram illustrating a method of using the luma of present pixels of an exemplary pixel constellation to determine the per-pixel repeat field luma difference, as referenced with the execution phase of the MAD-3:2, in accordance with an embodiment of the invention. The pixel constellation comprises the pixels labeled A through G shown in FIG. 11, associated with five consecutive field phases. The pixel labeled O corresponds to an absent output pixel of the progressive video output frame of the MAD-3:2. As illustrated in Table 2, there are two field phases in which the repeat fields are not visible for the pixel constellation shown in the representative embodiment of FIG. 10. As a result, the per-pixel repeat field difference for these two field phases are set to zero. This occurs when the execution field phase is at field phase 0 or field phase 1. Else, at execution field phases 2, 3, or 4, the per-pixel repeat field difference may be computed using one or more present pixels provided by the two repeated bottom fields of the pull-down source film frame. Similarly, in another representative embodiment, the per-pixel repeat field difference may be computed using one or more present pixels provided by the two repeated top fields. As illustrated in FIG. 10, the 3:2 pattern alternates between repeated top fields and bottom fields. Although not illustrated in FIGS. 10 and 11, one may utilize additional pixel constellations that follow execution phase 0 corresponding to one or more future field phases, in which, one or more per-pixel repeat field differences may be computed. These per-pixel repeat field differences, for example, may be associated with the two repeated top fields. Although not illustrated, in one representative embodiment, the use of a pixel constellation spanning seven consecutive fields obviates an occurrence in which the per-pixel repeat field difference is out of temporal range of the pixel constellation (and hence defined as zero), in any of the five field phases.

Table 2 provides the relevant equations concerning the per-pixel repeat field difference (pprfd) for each execution field phase, when five consecutive field phases are utilized. For example, the pprfd for execution field phase 2 equals the absolute value of the luma difference between pixel A and pixel B.

TABLE 2

Per-Pixel Repeat Field Difference in Execution Phase

| Execution Field Phase | Per-pixel repeat field difference (pprfd) |
|---|---|
| 0 | 0 |
| 1 | 0 |
| 2 | abs(A − B) |
| 3 | MAX<abs(C − $E_0$), abs(D − $F_0$)> |
| 4 | abs(B − G) |

The following equation provides the per-pixel repeat field motion for a particular field.

$$pprfm = \begin{cases} 0 & \text{when } pprfd < pprf\_thresh \\ pprf\_gain \cdot pprfd & \text{when } pprfd \geq pprf\_thresh \end{cases}$$

The per-pixel repeat field difference as referenced from the execution phase, as shown in Table 2, is cored and multiplied by a gain to give the final value for the per-pixel repeat field motion. A value of zero obtained from the value of pprfm indicates that no unexpected pixel changes have occurred in the repeat field. As a result, the output absent pixel, O, as illustrated in FIG. 10, should be biased towards the directed weave of a reverse 3:2 pull-down. If pprfm is a large number, then it is assumed that there exists some localized interlaced motion. When pprfm is large, the output for pixel O should be biased towards the motion adaptive deinterlaced (MAD) spatial/temporal blend. With regard to ppfrm, the value for pprf_thresh may be configured to any value and may comprise a user programmable value. The value pprf_gain may be one or more values configured by a user. The value for pprf_gain may comprise a user programmable value.

Figure 11:
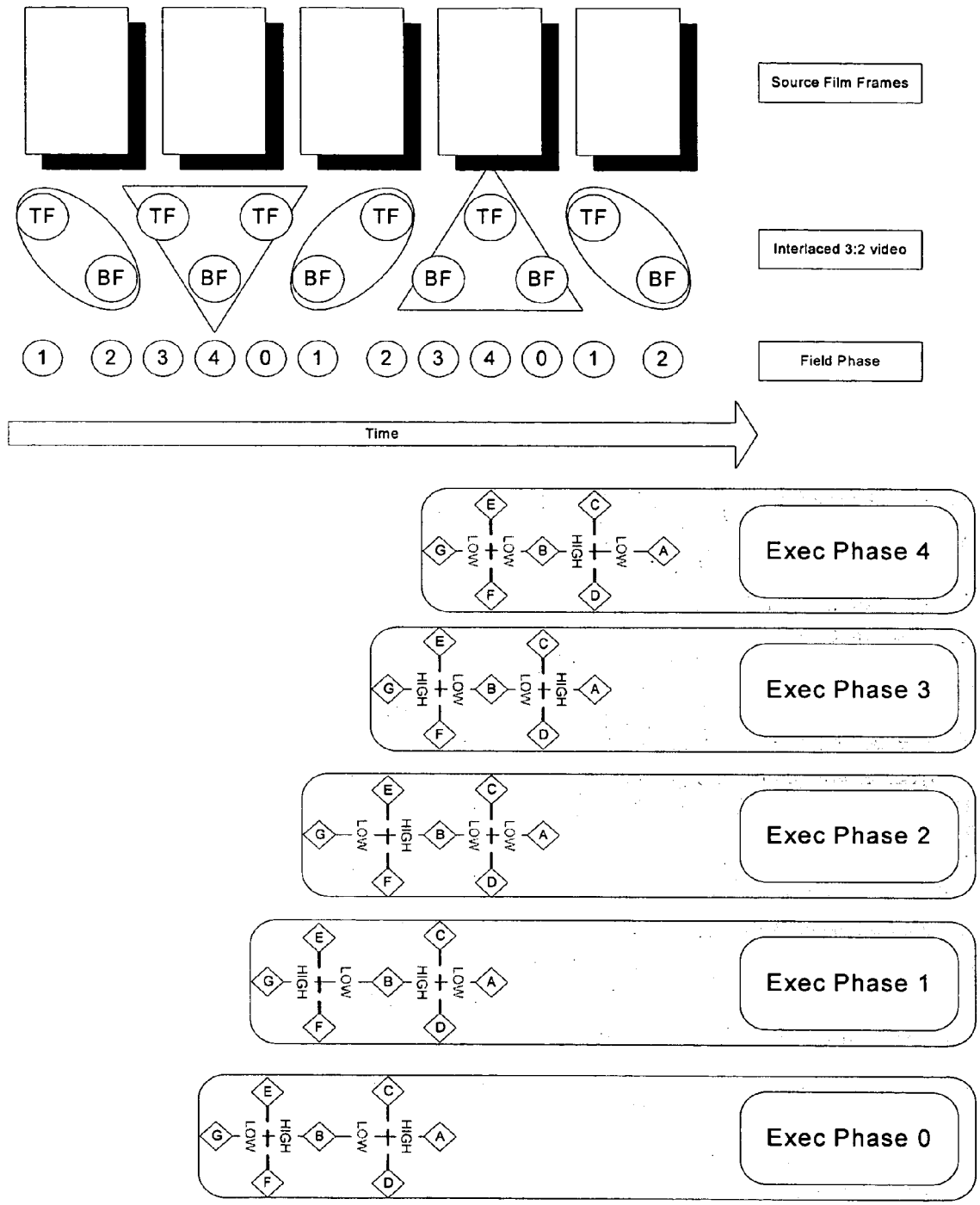
FIG. 11 is a block diagram illustrating a method of using one or more luma values of present pixels of an exemplary pixel constellation to determine conformity to one or more expected "High/Low" luma difference patterns between pixels of a progressive video output frame, as referenced to the execution phase of the MAD-3:2, in accordance with an embodiment of the invention.

FIG. 11 is a block diagram illustrating a method of using one or more luma values of present pixels of an exemplary pixel constellation to determine conformity to one or more expected "High/Low" luma difference patterns 904 between pixels of a progressive video output frame, as referenced to the execution phase of the MAD-3:2, in accordance with an embodiment of the invention. The pixel constellation comprises the pixels labeled A through G shown in FIG. 11. The method used is similar to the "bad-edit" detection procedure as previously described in reference to FIG. 9; however, further information about unexpected (non-source frame aligned) motion can be determined on a per-pixel level. The execution phase follows the detection phase by two fields. This means that while the detection phase is currently at field phase 2, for example, the execution phase using the same pixel constellation is at field phase 0. The unexpected field differences during the execution phase are listed in Table 3 but it may be noted that they are the same patterns and equations as shown in Table 1 but are offset by two time units with respect to the field phase.

TABLE 3

Unexpected Field Difference In Execution Phase

| Field Phase in Execution Phase | Expected High/Low Pattern | Exec Pixel Unexpected Difference (ppufd) |
|---|---|---|
| 0 | HIGH-LOW-HIGH-LOW | $MAX\langle d_1, d_3 \rangle - \left(\frac{d_0 + d_2}{2}\right)$ |
| 1 | LOW-HIGH-LOW-HIGH | $MAX\langle d_0, d_2 \rangle - \left(\frac{d_1 + d_3}{2}\right)$ |
| 2 | LOW-LOW-HIGH-LOW | $MAX\langle d_0, d_1, d_3 \rangle - d_2$ |
| 3 | HIGH-LOW-LOW-HIGH | $MAX\langle d_1, d_2 \rangle - \left(\frac{d_0 + d_3}{2}\right)$ |
| 4 | LOW-HIGH-LOW-LOW | $MAX\langle d_0, d_2, d_3 \rangle - d_1$ |

The per-pixel unexpected field motion is then determined from the unexpected field difference by coring and multiplying by a gain. As shown, the expected "high/low" pattern listed in column 2 of Table 3 coincides with the pattern shown in FIG. 11. Again, the measure of "unexpected" motion at the detector for the current pixel constellation may be given by the "maximum of the lows minus the average of the highs" or the "maximum of the lows minus the minimum of the highs" or some other calculation that compares what is expected between corresponding pixels of fields and what is actually measured. The following equation represents the per-pixel unexpected field motion:

$$ppufm = \begin{cases} 0 & \text{when } ppufd < ppufd\_thresh \\ ppuf\_gain^* ppufd & \text{when } ppufd \geq ppufd\_thresh \end{cases}$$

When ppufm is large, the output for absent pixel O should be biased towards the motion adaptive deinterlaced (MAD) spatial/temporal blend. As a consequence, as ppufm increases, the luma of the output should be derived using less reverse 3:2 pull-down weave and more motion adaptive de-interlacing.

Figure 12:
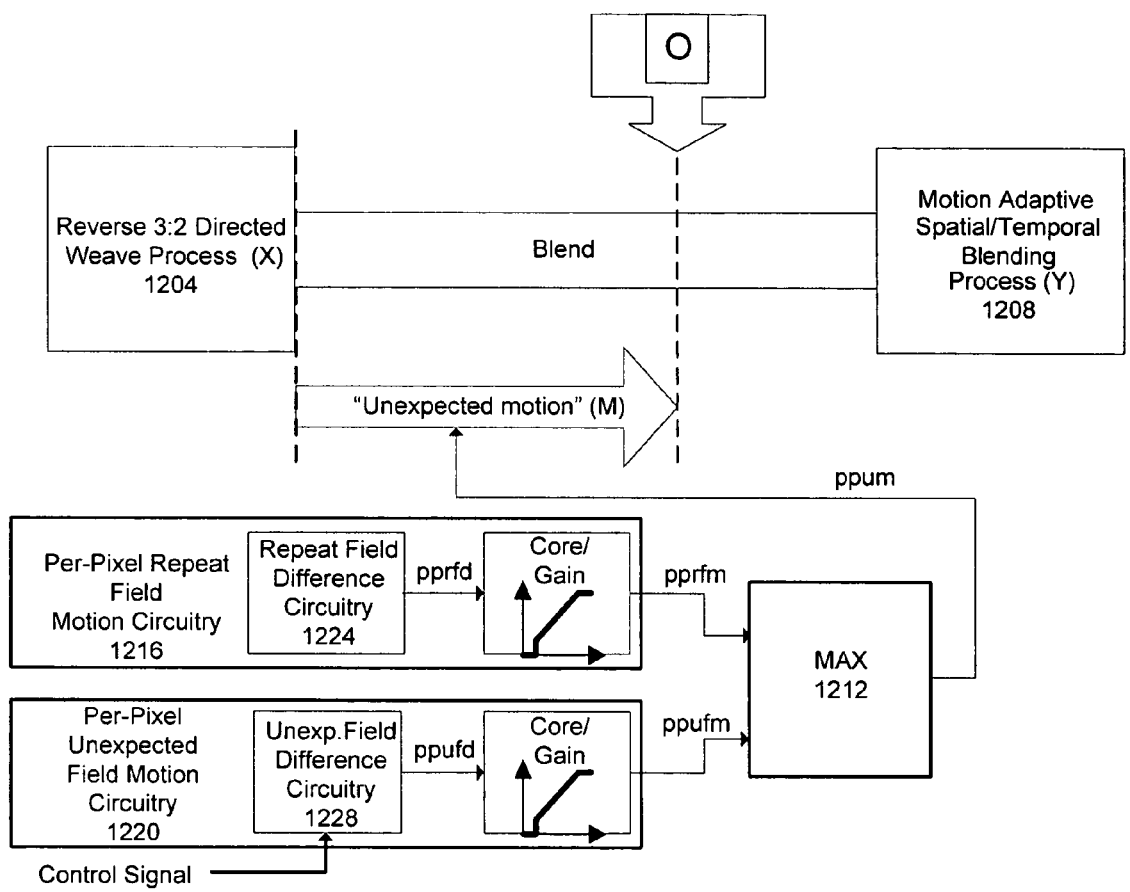
FIG. 12 is a block diagram illustrating a blend or merging of the reverse 3:2 weave process and the motion adaptive deinterlace process used for generating one or more output pixel luma in accordance with an embodiment of the invention.

FIG. 12 is a block diagram illustrating a blend or merging of the reverse 3:2 weave process 1204 and the motion adaptive deinterlace process 1208 used for generating one or more output pixel luma in accordance with an embodiment of the invention. For each output absent pixel, O, these two processes 1204, 1208 may be blended to generate an approximation for the luma for the output absent pixel, O. The reverse 3:2 weave process 1204 comes from the directed weave governed by the current field phase; which in turn has been determined from the 3:2 pull-down cadence lock. The motion adaptive deinterlace process 1208 comes from the blend of the spatial and temporal averages, as governed by the amount of motion measured.

When the 3:2 PLD circuit is unlocked, either due to the fact that it has not yet found the correct lock point or that the provided fields were originally TV based rather than film based (and as such, there is no pull-down to find) then each output absent pixel, O, will solely be determined from motion governed spatial and temporal averages. If and when phase lock occurs, the directed weave of the reverse 3:2 pull-down solely determines each output absent pixel, O, with no regard for the motion adaptive deinterlace (MAD) process 1208. In certain instances, however, it may be beneficial to perform a blend of the two processes 1204, 1208 for the sake of more accurately predicting an output absent pixel, O. For example, a video may have mixed interlaced and film based material. Film based material will only exhibit motion between fields sourced from different film frames. Interlaced material can exhibit motion between each field. The assumption of the reverse 3:2 pull-down procedure relies on the fact that the directed weave is safe because only certain fields may exhibit motion. Hence, anywhere where this assumption is violated visible artifacts will result. An example of this type of violation is the overlay of credits/titles in the opening scenes of a movie. In the process of performing the pan-and-scan conversion of the widescreen format of the film to the 4:3 aspect ratio for TV display, the original film credits may be too wide and are truncated at their left and right edges. Sometimes, the movie will have the 3:2 pull-down process performed without the credits. Then, the credits are overlaid in a post-processing step. If these credits scroll or fade then they should only do so on the original frame boundaries of the film material they overlay. Often, however, this is not the case. One or more pixels may be examined at the time the estimate for output absent pixel, O, is being processed. If they fit the expected pattern of motion then the directed weave of the reverse 3:2 pull-down is used. However, if unexpected motion is observed or determined, the motion based deinterlace procedure is used. In the embodiment shown in FIG. 12, a blend or combination of a direct weave and a motion based deinterlace is performed to provide an approximation of the luma for the output (absent) pixel, O. In one embodiment, the maximum of the per-pixel repeat field motion and the per-pixel unexpected field motion is determined by the following equation:

$$ppum = MAX<pprfm, ppufm>$$

The value ppum is the value that is then used to determine the merge point between the reverse 3:2 and the motion adaptive deinterlace (MAD) approximations of each output pixel O, as shown in FIG. 12. In one embodiment, ppum is used to generate a weighted average of the reverse 3:2 and the MAD approximations of each output pixel. As indicated by the equation for ppum and illustrated in FIG. 12, the MAX function 1212 may comprise circuitry that generates the maximum of two values, such as that provided by pprfm and that provided by ppufm. The values of pprfm and ppufm are generated using a per-pixel repeat field motion (pprfm) circuitry 1216 and per-pixel unexpected field motion (ppufm) circuitry 1220 as illustrated in FIG. 12. The ppufm circuitry 1216 may be enabled using a control signal as shown. The pprfm circuitry 1216 and ppufm circuitry 1220 may comprise a combination of analog and digital circuitry that is capable of generating the pprfm and the ppufm values. The per-pixel repeat field motion circuitry 1216 comprises a repeat field difference circuitry 1224 while the per-pixel unexpected field motion block 1220 comprises an unexpected field difference 1228 circuitry. The output of the repeat field difference circuitry 1224 comprises the value pprfd while the output of the per-pixel unexpected field motion circuitry 1228 comprises the value ppufd. After coring and applying a gain (pprf_gain or ppuf_gain), the respective outputs, pprfm and ppufm are generated.

Figure 13:
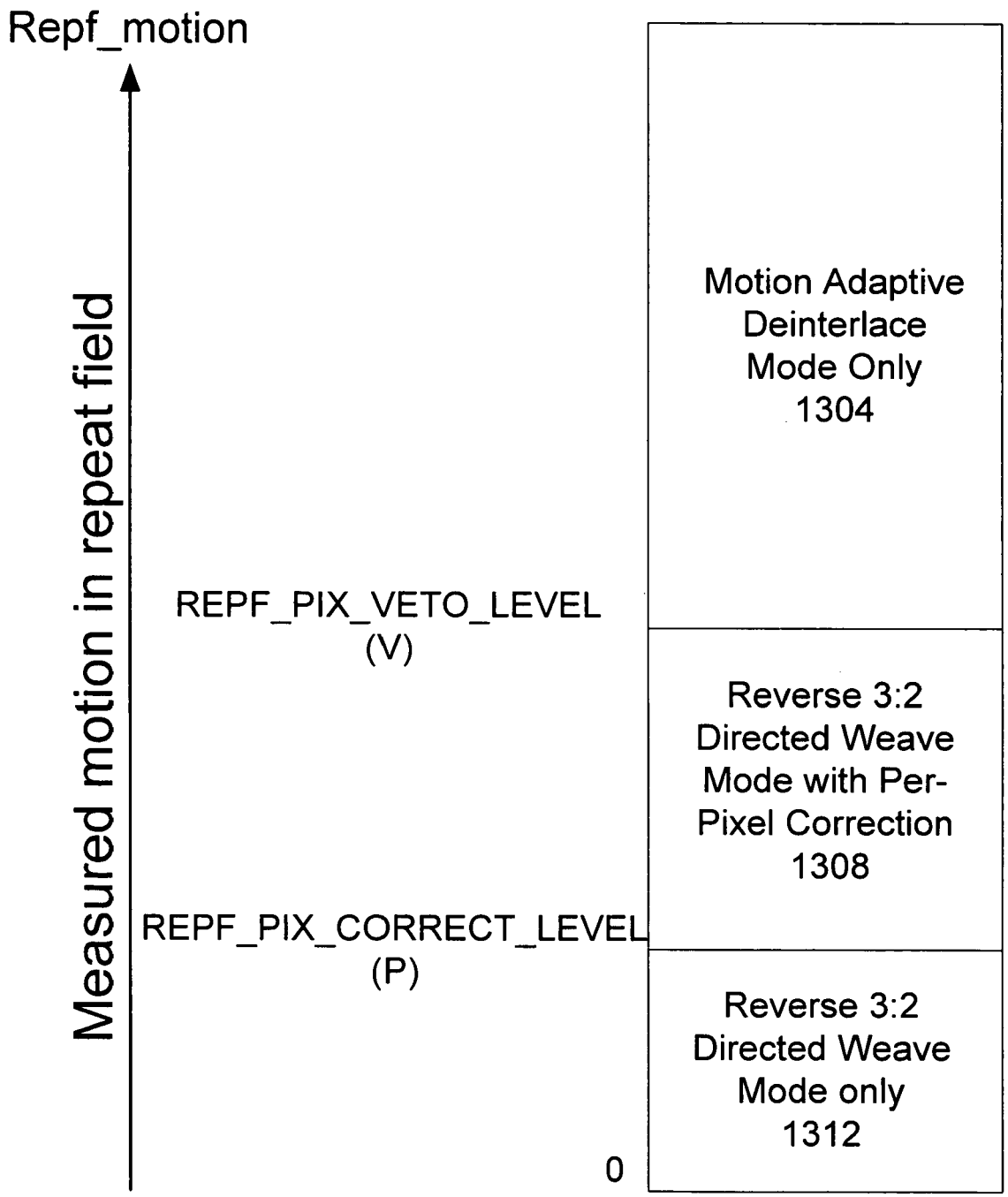
FIG. 13 is a block diagram illustrating three possible modes of operation for the MAD-3:2, that are automatically activated as a function of repeat field motion, in accordance with an embodiment of the invention.

FIG. 13 is a block diagram illustrating three possible modes of operation for the MAD-3:2, that are automatically activated as a function of repeat field motion, in accordance with an embodiment of the invention. The three possible modes comprise a motion adaptive deinterlace mode 1304, a reverse 3:2 directed weave plus per-pixel correction 1308, and a reverse 3:2 directed weave 1312. Most deinterlacers with reverse 3:2 capability provide two modes. They are either in unlocked mode and performing a standard deinterlace, or they are locked to a pull-down phase and performing the reverse 3:2 directed weave. In addition to these two modes, aspects of the invention comprise a third mode, used as an intermediate mode, that incorporates per-pixel correction using the reverse 3:2 directed weave. In this third mode, phase lock is maintained and those pixels exhibiting interlaced motion, as determined by a calculation of ppufm and/or pprfm, may be corrected using the blending process illustrated in FIG. 12. In the embodiment illustrated in FIG. 13, the calculated value of repf_motion is compared against two threshold levels. The two threshold levels are used to transition between the three different modes. In one embodiment, the two thresholds are termed REPF_PIX_VETO_LEVEL and REPF_PIX_CORRECT_LEVEL, as illustrated in FIG. 13, and are used to transition among the three different operational states shown. In one embodiment, the REPF_PIX_VETO_LEVEL corresponds to variable V, having the higher threshold value, while the REPF_PIX_CORRECT_LEVEL corresponds to the variable P, having the lower threshold value. The variables V and P were previously described in reference to FIG. 5. The value of repf_motion is compared against the two thresholds. The results of the threshold comparisons, using repf_motion against the two thresholds, are valid until their values are updated in five fields' time (e.g., has a periodicity of five field phases).

If the value of repf_motion is less than REPF_PIX_CORRECT_LEVEL, the blending process as described previously is disabled. If the repf_motion is larger than REPF_PIX_CORRECT_LEVEL but lower than REPF_PIX_VETO_LEVEL, the blending process is enabled while performing a reverse 3:2 directed weave. If the value of repf_motion is greater than the REPF_PIX_VETO_LEVEL, then this phase is vetoed, the lock is removed, and the deinterlacer reverts to motion adaptive deinterlace (MAD) mode. These concepts are illustrated in the block diagram of FIG. 13.

In one embodiment, the per-pixel unexpected field motion (ppufm) circuitry 1220 may be enabled or disabled by the value provided by repf_motion:

$$repf\_motion = (bin_2 + bin_3) + 2(bin_4 + bin_5 + bin_6 + bin_7) + 4\sum_{n=8}^{15} bin_n + 8\sum_{n=16}^{63} bin_n$$

The aforementioned repf_motion equation may be referenced in U.S. application Ser. No. 10/871,758 filed Jun. 17, 2004, which application is incorporated herein by reference in its entirety.

One or more advantages are provided by the one or more representative embodiments of the present invention. In reference to FIG. 13, variation of the threshold levels, REPF_PIX_VETO_LEVEL and REPF_PIX_CORRECT_LEVEL, may adjust the operational range for the reverse 3:2 directed weave with per-pixel correction mode. Hence, the thresholds levels may be used to adjust the transition from a reverse 3:2 directed weave mode to a motion adaptive deinterlace mode, by way of using a buffer region. The buffer region acts as an intermediate state between the reverse 3:2 directed weave mode and the motion adaptive deinterlace mode.

Figure 14:
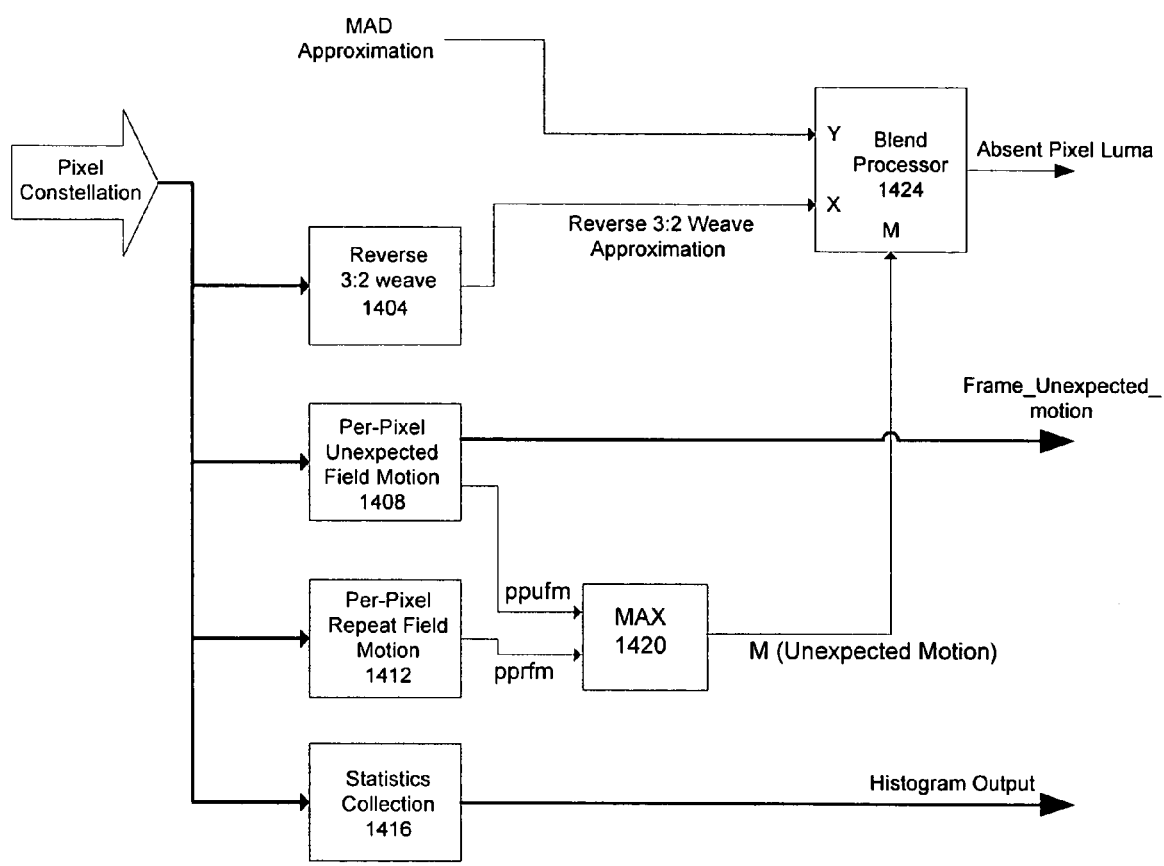
FIG. 14 is a block diagram illustrating a pixel computation system that is used to generate absent pixel luma in accordance with an embodiment of the invention.

FIG. 14 is a block diagram illustrating a pixel computation system that is used to generate absent pixel luma in accordance with an embodiment of the invention. The pixel computation system contains several computation subsystems used in the processing of the absent pixel luma. The pixel computation system comprises a reverse 3:2 weave subsystem 1404, a per-pixel unexpected field motion (ppufm) subsystem 1408, a per-pixel repeat field motion (pprfm) subsystem 1412, a statistics collection subsystem 1416, an unexpected motion subsystem (that generates the maximum of two values) 1420, and a blend processor 1424. A field of present pixels is used to generate progressive video output frames. The ppufm subsystem 1408 generates the per-pixel unexpected field motion (ppufm) and also implements the summing registers used to produce the frame_unexpected_motion values used in "bad-edit" detection, as described earlier. The pprfm subsystem 1412 generates pprfm so that the unexpected motion subsystem 1420 may be used to generate the maximum of ppumfm or pprfm values. The reverse 3:2 weave subsystem 1404 provides a reverse 3:2 directed weave approximation of the absent pixel luma. The statistics collection subsystem 1416 generates histogram values and computes sigma values. As illustrated the output, M, provided by the unexpected motion subsystem 1420 is used to control the blend processor 1424. The blend processor 1424 receives inputs that comprise the reverse 3:2 weave subsystem 1404 and a motion adaptive deinterlace (MAD) input. The blend processor 1424 blends the inputs in proportions controlled by the output, M. The subsystems 1404, 1408, 1412, 1416, 1420, 1424 that comprise the pixel computation system may comprise circuitry such as digital and analog circuitry, capable of implementing the system shown in FIG. 14.

The one or more representative embodiments that determine the per-pixel unexpected field motion (ppufm) and/or the per-pixel repeat field motion (pprfm), as previously discussed, may be extended to include one or more differences associated with additional constellation pixels beyond the pixel constellations considered. As a consequence, one or more additional fields beyond the five fields described, may be considered when computing the per-pixel unexpected difference (ppufd) and/or per-pixel repeat field difference (pprfd). For example, the exemplary pixel constellation illustrated in FIGS. 10 and 11, may be extended to include additional constellation pixels beyond pixel G, such that additional terms may be utilized when computing the per-pixel unexpected difference (ppufd) and/or per-pixel repeat field difference (pprfd). In one representative embodiment, per-pixel repeat field difference (pprfd) equations may be established for all field phases when the number of fields spanned by the pixel constellation utilized is extended from five to seven. In another representative embodiment, additional pixels, spanning vertical and/or horizontal dimensions may be incorporated into the pixel constellation when computing the per-pixel unexpected difference (ppufd) and/or the per-pixel repeat field difference (pprfd).

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. An apparatus comprising:
   one or more circuits operative for, at least:
   first computing vertical approximations of luminance values for one or more absent pixels in a field phase of one or more video frames, said approximations performed using one or more present pixels;
   second computing one or more first differences between each of said vertical approximations and corresponding luminance values of pixels in one or more adjacent fields of said field phase of said one or more video frames;
   categorizing said one or more first differences into a first set of high values and a second set of said low values for said field phase; and
   subtracting a second value from a maximum of said second set of low values to generate a second difference, said second value computed by taking an average of said first set of high values, said first computing, second computing, categorizing, and subtracting performed to detect and correct pixels that do not conform to expected luminance values when performing a reverse pull-down of video.

2. The apparatus of claim 1 wherein said first computing and said second computing is performed over a number of consecutive field phases.

3. The apparatus of claim 2 wherein said number comprises the value five.

4. The apparatus of claim 1 wherein each of said vertical approximations is calculated using the average of two vertically adjacent present pixels.

5. The apparatus of claim 1 wherein said one or more circuits is operative for, at least:
   first setting a first variable equal to zero if said second difference is less than a threshold value; and
   second setting said first variable equal to a product of a factor and said second difference, if said second difference is not less than said threshold value.

6. The apparatus of claim 1 wherein said one or more circuits is operative for, at least:
   computing a third difference between corresponding pixels of repeat fields of said execution field phase of said video frames;
   first setting a second variable equal to zero if said third difference is less than a threshold value; and
   second setting said second variable equal to a product of a factor and said third difference, if said third difference is not less than said threshold value.

7. The apparatus of claim 6 wherein said one or more circuits is operative for, at least:
   determining a maximum value using said first variable and said second variable;
   using said maximum value to control blending of a first luma value to a second luma value.

8. The apparatus of claim 7 wherein said first luma value comprises luma generated from a reverse 3:2 directed weave process.

9. The apparatus of claim 7 wherein said second luma value comprises luma generated from a motion adaptive deinterlace (MAD) process.

10. The apparatus of claim 1 wherein said number of vertical approximations equals 2.

11. An apparatus comprising:
   one or more circuits operative for, at least:
      computing one or more luma difference values between corresponding pixels of repeat fields originating from the same source film frame, said computing performed over one or more field phases;
      first setting a corresponding variable equal to zero if each of said one or more luma difference values is less than a threshold value;
      second setting said corresponding variable equal to a product of a factor and said one or more difference values, if each of said one or more luma difference values is not less than said threshold value, said computing, first setting, and second setting performed to detect pixels that that do not conform to expected pull-down video.

12. The apparatus of claim 11 wherein said one or more repeat fields originate from 3:2 pull-down video.

13. An apparatus comprising:
   one or more circuits operative for, at least:
      first computing an approximation of the luminance for each absent pixel in one or more field phases for a progressive output video frame using one or more present pixels;
      second computing one or more first luminance differences between said approximation of luminance for each absent pixel and corresponding present pixels in one or more adjacent fields of said one or more field phases of said progressive output video frame,
      categorizing said one or more first luminance differences into one or more expected low values or one or more expected high values; and
      third computing one or more second differences, each of said one or more second differences calculated by subtracting the maximum of said one or more expected low differences by an average of said one or more expected high differences, said first computing, second computing, categorizing, and third computing performed to detect changes in cadence of pull-down video.

14. The apparatus of claim 13 wherein said one or more circuits is operative for, at least:
   summing one or more corresponding values associated with said one or more second differences, said summing performed over all absent pixels of said progressive output video frame.

15. The apparatus of claim 14 wherein said one or more circuits is operative for, at least:
   resetting all phase counters of a phase lock detector circuitry when said summing over all absent pixels of said progressive output video frame results in a summation that exceeds a threshold value.

16. A method of automatically enabling a per-pixel correction process while performing a reverse 3:2 directed weave comprising:
   using said reverse 3:2 directed weave if a variable is below a first threshold;
   using said reverse 3:2 directed weave with said per-pixel correction process if said variable is equal to or above a first threshold but below a second threshold; and
   using a motion adaptive deinterlace (MAD) process if said variable is equal to or above said second threshold.

17. The method of claim 16 wherein said variable comprises repeat field motion (repf_motion).

18. The method of claim 16 wherein said variable comprises a measure of repeat field motion of repeat fields in a reverse pull-down video.

19. A system for detecting and correcting pixels that do not conform to expected luminance values when performing a reverse pull-down of video, said system comprising:
   at least one circuitry for:
      detecting and computing per-pixel unexpected field motion and per-pixel repeat field motion;
      computing a maximum of said per-pixel unexpected field motion and said per-pixel repeat field motion; and
      blending a first luma value and a second luma value in proportions controlled by using said maximum.

20. The system of claim 19 wherein said blending comprises taking a weighted average.

21. The system of claim 20 wherein said first luma value comprises a luma generated from a reverse 3:2 directed weave approximation.

22. The system of claim 20 wherein said second luma value comprises a luma generated from a motion adaptive deinterlace (MAD) approximation.

23. A method of detecting changes in the cadence of pull-down video comprising:
   computing an approximation of the luminance for each absent pixel in one or more field phases for a progressive output video frame using one or more present pixels;
   computing one or more first luminance differences between said approximation of luminance for each absent pixel and corresponding present pixels in one or more adjacent fields of said one or more field phases of said progressive output video frame, categorizing said one or more first luminance differences into one or more expected low values or one or more expected high values;

computing one or more second differences, each of said one or more second differences calculated by subtracting the maximum of said one or more expected low differences by an average of said one or more expected high differences; and summing one or more corresponding values associated with said one or more second differences, said summing performed over all absent pixels of said progressive output video frame.

24. A method of detecting changes in the cadence of pull-down video comprising:

computing an approximation of the luminance for each absent pixel in one or more field phases for a progressive output video frame using one or more present pixels;

computing one or more first luminance differences between said approximation of luminance for each absent pixel and corresponding present pixels in one or more adjacent fields of said one or more field phases of said progressive output video frame, categorizing said one or more first luminance differences into one or more expected low values or one or more expected high values;

computing one or more second differences, each of said one or more second differences calculated by subtracting the maximum of said one or more expected low differences by an average of said one or more expected high differences; and resetting all phase counters of a phase lock detector circuitry when said summing over all absent pixels of said progressive output video frame results in a summation that exceeds a threshold value.

25. An apparatus comprising:

one or more circuits operative for, at least:

first computing vertical approximations of luminance values for one or more absent pixels for a field phase of one or more progressive output video frames, said approximations performed using one or more present pixels;

second computing one or more first values for each of one or more first differences between each of said approximations and corresponding luminance values of pixels in one or more adjacent fields of said field phase of said one or more progressive output video frames;

categorizing said one or more first differences into a first set of high values and a second set of said low values for said field phase;

subtracting a second value from a maximum of said second set of low values to generate a second difference, said second value computed by taking an average of said first set of high values;

first setting a first variable equal to zero if said second difference is less than a threshold value; and second setting said first variable equal to a product of a factor and said second difference, if said second difference is not less than said threshold value, said first computing, second computing, categorizing, subtracting, first setting, and second setting performed for detecting and correcting pixels that do not conform to expected luminance values when performing a reverse pull-down of video.

26. An apparatus comprising:

one or more circuits operative for, at least:

first computing vertical approximations of luminance values for one or more absent pixels for a field phase of one or more progressive output video frames, said approximations performed using one or more present pixels;

second computing one or more first values for each of one or more first differences between each of said approximations and corresponding luminance values of pixels in one or more adjacent fields of said field phase of said one or more progressive output video frames;

categorizing said one or more first differences into a first set of high values and a second set of said low values for said field phase;

subtracting a second value from a maximum of said second set of low values to generate a second difference, said second value computed by taking an average of said first set of high values;

third computing a third difference between corresponding pixels of repeat fields of said execution field phase of said progressive output video frame;

first setting a second variable equal to zero if said third difference is less than a threshold value; and second setting said second variable equal to a product of a factor and said third difference, if said third difference is not less than said threshold value, said first computing, second computing, categorizing, subtracting, third computing, first setting, and second setting performed for detecting and correcting pixels that do not conform to expected luminance values when performing a reverse pull-down of video.

27. The apparatus of claim 26 wherein said one or more circuits is operative for, at least:

determining a maximum value using said first variable and said second variable; and using said maximum value to control blending of a first luma value to a second luma value.

28. The apparatus of claim 27 wherein said first luma value comprises luma generated from a reverse 3:2 directed weave process.

29. The apparatus of claim 27 wherein said second luma value comprises luma generated from a motion adaptive deinterlace (MAD) process.

30. A system for detecting and correcting pixels that do not conform to expected luminance values when performing a reverse pull-down of video, said system comprising:

at least one circuitry that detects and computes per-pixel unexpected field motion and per-pixel repeat field motion, said at least one circuitry computes histograms and variances, a maximum of one or more values, said at least one circuitry blending two values in proportions controlled by using said maximum, said blending comprising taking a weighted average, said one of said two values comprising a luma generated from a reverse 3:2 directed weave approximation.

31. A system for detecting and correcting pixels that do not conform to expected luminance values when performing a reverse pull-down of video, said system comprising:

at least one circuitry that detects and computes per-pixel unexpected field motion and per-pixel repeat field motion, said at least one circuitry computes histograms and variances, a maximum of one or more values, said at least one circuitry blending two values in proportions controlled by using said maximum, said blending comprising taking a weighted average, said one of said two values comprising a luma generated from a motion adaptive deinterlace (MAD) approximation.

32. An apparatus comprising:

one or more circuits operative for, at least, detecting changes in cadence of pull-down video by way of computing an approximation of the luminance for each absent pixel in one or more field phases and determining luma differences between corresponding pixels of adjacent fields of said pull-down video using said approximation.

* * * * *